(12) United States Patent
Wada et al.

(10) Patent No.: US 8,006,824 B2
(45) Date of Patent: Aug. 30, 2011

(54) STORAGE SYSTEM AND STORAGE METHOD

(75) Inventors: Ryoichi Wada, Tokyo (JP); Issei Isaka, Tokyo (JP); Kunio Katayanagi, Tokyo (JP)

(73) Assignee: Hirata Corporation, Tokyo (JP)

( * ) Notice: Subject to any disclaimer, the term of this patent is extended or adjusted under 35 U.S.C. 154(b) by 281 days.

(21) Appl. No.: 12/514,717

(22) PCT Filed: Nov. 16, 2006

(86) PCT No.: PCT/JP2006/322845
§ 371 (c)(1),
(2), (4) Date: Jun. 25, 2009

(87) PCT Pub. No.: WO2008/059573
PCT Pub. Date: May 22, 2008

(65) Prior Publication Data
US 2010/0042249 A1 Feb. 18, 2010

(51) Int. Cl.
*B65G 37/00* (2006.01)
(52) U.S. Cl. .......... 198/347.1; 198/468.6; 414/286; 414/277
(58) Field of Classification Search .......... 198/347.1, 198/468.6; 414/277, 286, 792.9
See application file for complete search history.

(56) References Cited

U.S. PATENT DOCUMENTS

| | | | |
|---|---|---|---|
| 4,678,390 A * | 7/1987 | Bonneton et al. | 414/286 |
| 4,850,783 A * | 7/1989 | Maekawa | 414/792.9 |
| 4,993,906 A | 2/1991 | Nisimura et al. | |
| 5,380,138 A * | 1/1995 | Kasai et al. | 414/277 |
| 5,680,936 A * | 10/1997 | Beers | 198/468.6 |
| 6,362,443 B1 | 3/2002 | Kinoshita et al. | |
| 6,425,226 B1 | 7/2002 | Kirschner | |
| 6,468,021 B1 * | 10/2002 | Bonora et al. | 198/468.6 |
| 6,729,836 B2 * | 5/2004 | Stingel et al. | 198/347.1 |

(Continued)

FOREIGN PATENT DOCUMENTS
JP    63-209904    8/1988
(Continued)

OTHER PUBLICATIONS

International Search Report issued in the International (PCT) Application of which the present application is the U.S. National Stage.

*Primary Examiner* — James R Bidwell
(74) *Attorney, Agent, or Firm* — Wenderoth, Lind & Ponack, L.L.P.

(57) ABSTRACT

A storage system of the present invention includes a storage area for arranging and storing articles (W), a carrying-in line (200) for carrying in the articles (W) toward the storage area, and a transfer mechanism (300) arranged on an upper region of the storage area in order to transfer the articles (W) carried in by the carrying-in line to the storage area. The storage area includes a supporting table (100) for arranging and supporting a plurality of pallets (P) capable of loading the articles (W), and the transfer mechanism (300) transfers the articles (W) to the pallets (P) supported on the supporting table (100). Since an operation for transferring the articles stored directly on the floor face as before to the pallets is not required, a carrying-out process is simplified and efficiency of storage process of the articles as a whole (carrying-in from the outside, transfer to the storage area, carrying-out to the outside) is improved.

17 Claims, 37 Drawing Sheets

U.S. PATENT DOCUMENTS

2004/0265097 A1    12/2004    Kim et al.
2006/0257236 A1*    11/2006    Stingel et al. .............. 198/347.1

FOREIGN PATENT DOCUMENTS

| | | |
|---|---|---|
| JP | 7-61603 | 3/1995 |
| JP | 9-155844 | 6/1997 |
| JP | 2000-238906 | 9/2000 |
| JP | 2001-182355 | 7/2001 |
| JP | 2002-68419 | 3/2002 |
| JP | 2002-193403 | 7/2002 |
| JP | 2003-201003 | 7/2003 |
| JP | 2004-44139 | 2/2004 |
| JP | 2006-519150 | 8/2006 |
| WO | 00/26128 | 5/2000 |
| WO | 2004/076321 | 9/2004 |

* cited by examiner

STORAGE SYSTEM AND STORAGE METHOD

TECHNICAL FIELD

The present invention relates to a storage system and a storage method for carrying an article such as a product (a tire or the like, for example) into a predetermined storage area for storage and for carrying it out according to a request and particularly to a storage system and a storage method for storing with stacking various diversified articles.

BACKGROUND ART

As a conventional storage system, an automatic warehouse is known which is provided with a storage area constituted by an indoor floor face (concrete face) or the like formed so as to stack and store products in plural stages according to type, a warehousing area provided adjacently to the storage area and for carrying in products stacked on a pallet from outside, a delivery area provided adjacently to the storage area and for carrying out the stored products by stacking them on an empty pallet according to a request, a transfer apparatus for warehousing that is arranged on a ceiling region and capable of three-dimensional movement so as to transfer products from the warehousing area to the storage area, a transfer apparatus for delivery that is arranged on the ceiling region and capable of three-dimensional movement so as to transfer products from the storage area to the delivery area and the like (See Patent Document 1, for example).

However, in this storage system, the products carried into the warehousing area and in a standby state are sorted according to types thereof and stored in the storage area and then, the same type of products are transferred onto a pallet standing by in the delivery area according to a delivery instruction and carried out to a required outside area (subsequent process where the products are required, for example) from the storage area. That is, since a transfer operation of the products is processed in two stages, namely, a warehousing and transfer operation from the warehousing area to the storage area and a delivery and transfer operation from the storage area to the delivery area, time required for storage processing gets long, and efficiency of the storage processing is drastically lowered.

Also, since the transfer apparatuses for performing the storage processing are separate, which are the transfer apparatus for carrying-in (warehousing) for transferring the products from the warehousing area to the storage area and the transfer apparatus for carry-out (delivery) for transferring the products from the storage area to the delivery area, if the balance between warehousing and delivery of the products becomes wrong, an operation efficiency of the storage processing is lowered, in a manufacturing process or the like using the product, an influence given on a prior process or subsequent process becomes significant.

Also, since the storage area is constituted by an indoor floor face (concrete face) or the like, the products are directly stacked on the floor face according to type and masses of the stacked products are stored in a planarly arranged state and in close contact (adjacently) with each other, once they are stacked and arranged, it is difficult to move the stacked products to another region within the storage area, and an allocated region for stacking the products within the storage area cannot be changed easily.

Moreover, since the warehousing area and the delivery area are planarly arranged as separate areas adjacent to an outer periphery of the storage area, if a product is to be transferred from the warehousing area to the farthest allocated region (stacking region) of the storage area or if the product is to be transferred from the farthest allocated region (stacking region) of the storage area to the delivery area, a moving distance of the transfer apparatus becomes long, which incurs deterioration of the transfer efficiency (storage processing).
Patent Document 1: Japanese Unexamined Patent Publication No. 2000-238906

DISCLOSURE OF INVENTION

Problem to be Solved by the Invention

The present invention was made in view of the circumstances of the above prior art and has an object to provide a storage system and a storage method which can efficiently perform processing from carrying-in to storage of an article (a product such as a tire or the like, for example) or processing of carrying out the article in storage according to a request while promoting space saving of an installation area, size reduction, simplification of a structure and the like, can improve storage processing efficiency as a whole, can sort and surely store various and diversified articles according to types thereof and moreover, can correctly and easily take out the article in storage according to a request.

Means for Solving Problem

The storage system of the present invention in order to achieve the above object is provided with a storage area for arranging and storing articles, a carrying-in line for carrying in the articles toward the storage area, and a transfer mechanism arranged in an upper region of the storage area so as to transfer the articles carried in by the carrying-in line to the storage area. The storage area includes a supporting table for arranging and supporting a plurality of pallets capable of loading articles, and the transfer mechanism transfers the articles to the pallet supported on the supporting table.

According to this configuration, when the articles are carried in by the carrying-in line, the transfer mechanism arranged on an upper region (ceiling region) in the storage area takes out the articles at a predetermined taking-out position on the carrying-in line and transfers it onto a predetermined pallet in a plurality of pallets supported by the supporting table in the storage area.

As mentioned above, since the articles are stored on the plurality of pallets on the supporting table defining the storage area, when the articles are to be taken out according to a request, by taking them out from the outside for each pallet using a carrying-out means such as a forklift or an automatic carrying-out line and the like, an operation to transfer the articles directly stored on the floor face onto the pallet as in the prior art is not required any more, carrying-out processing is simplified, and efficiency of the storage processing of the articles as a whole (carrying-in from the outside, transfer to the storage area, carrying-out to the outside) is improved. Also, if a storage (allocation) location of the articles is to be changed on the basis of a management plan of the articles, by taking in/out each pallet on which the articles are loaded with respect to the supporting position on the supporting table, the storage (allocation) location can be changed easily.

In the storage system with the above configuration, such a configuration can be employed that the supporting table includes a plurality of supporting tables arranged and provided on both sides, respectively, in the horizontal direction putting the carrying-in line between them.

According to this configuration, since (a single row or plural rows of) the supporting tables are arranged on both sides, respectively, so as to put the carrying-in line between them, the articles having been carried in by the carrying-in line can be sorted to the both sides and stored therein. Therefore, a storage capacity of the articles can be increased as a whole, and the transfer mechanism can perform the transfer operation in a short moving distance toward the both sides symmetrically with respect to the carrying-in line as a center, and thus, the transfer time can be reduced, and the transfer efficiency can be improved.

In the storage system with the above configuration, such a configuration can be employed that the supporting table includes a plurality of supporting tables arranged and provided on both sides, respectively, in the horizontal direction putting the carrying-in line between them, and the carrying-in line defines a taking-out position where the transfer mechanism takes out the article at a substantially center position in the storage area.

According to this configuration, since (a single row or plural rows of) the supporting tables are arranged on both sides, respectively, so as to put the carrying-in line between them, the articles having been carried in by the carrying-in line can be sorted to the both sides and stored therein. Therefore, the storage capacity of the articles can be increased as a whole, and since the transfer mechanism takes out the article at the substantially center position of the storage area and transfers it to a respective storage location (pallet), the transfer mechanism can perform the transfer operation in a short moving distance toward the both sides symmetrically with respect to the substantially center position as a center, and thus, the transfer time can be reduced, and the transfer efficiency can be further improved.

In the storage system with the above configuration, such a configuration can be employed that the carrying-in line defines a feeding face for feeding the article at a position higher than the maximum height of the article to be stacked on a pallet supported by the supporting table.

According to this configuration, when the transfer mechanism transfers the article on the carrying-in line to the pallet in the storage area, the transfer mechanism slightly lifts up the article from the feeding face and holds it and then, only moves it horizontally or downward so as to transfer it to the pallet and does not have to lift the article upward, and thus, the transfer operation can be simplified or a work amount (load) can be reduced for that amount, and the efficiency of the storage processing can be improved as a whole.

In the storage system with the above configuration, such a configuration can be employed that a pallet conveying line for carrying in the pallet toward the supporting table and/or for carrying out the pallet from the supporting table is included.

According to this configuration, an empty pallet (or a pallet on which the articles are partially loaded) is carried onto (a supporting position on) the supporting table by the pallet conveying line or the pallet on which the required article is loaded is carried out toward the outside from (the supporting position on) the supporting table.

Therefore, the carrying-in/out operation of the pallet and the carrying-out operation of the article can be performed efficiently.

In the storage system with the above configuration, such a configuration can be employed that the pallet conveying line includes a movable unit movable in the horizontal direction along the supporting table and for performing delivery of a pallet with the supporting position of the supporting table.

According to this configuration, since the pallet (an empty pallet or the pallet on which the article is loaded) is carried in or out with respect to (the supporting position on) the supporting table by the movable unit, the carrying-in/out operation of the pallet and the carrying-out operation of the article can be performed further efficiently.

In the storage system with the above configuration, such a configuration can be employed that the supporting table includes a plurality of supporting tables arranged and provided on both sides, respectively, in the horizontal direction putting the carrying-in line between them, and the movable unit is formed movably between the plurality of supporting tables.

According to this configuration, since the movable unit reciprocally moves between the supporting tables arranged on the both sides so that the pallet can be delivered with the supporting table on one side or the supporting table on the other side, taking in/out operation and carrying-out operation of the pallet which is empty or on which an article is loaded can be performed further efficiently.

In the storage system with the above configuration, such a configuration can be employed that the supporting table include a driving unit for giving a driving force to the pallet when the pallet is taken in/out with respect to a predetermined supporting position.

According to this configuration, when the pallet is transferred toward the supporting position on the supporting table from the movable unit or toward a movable table from the supporting position on the supporting table, by giving the driving force of the driving unit to the pallet, the transfer operation of the pallet can be performed smoothly.

In the storage system with the above configuration, such a configuration can be employed that the supporting table includes a positioning portion for positioning the pallet carried in from the outside at the supporting position.

According to this configuration, when the pallet is supported at the supporting position on the supporting table, since the positioning portion gives a positioning action while guiding the pallet, the pallet can be positioned at the predetermined supporting position on the supporting table with high accuracy.

In the storage system with the above configuration, such a configuration can be employed that a reading means for reading information of an information medium attached to the article having been carried in by the carrying-in line is included.

According to this configuration, since information (type, size and the like, for example) of the information medium (barcode label or the like, for example) attached to the carried-in article can be read by the reading means, the storage processing of the article can be performed smoothly on the basis of the information obtained by this reading means.

In the storage system with the above configuration, such a configuration can be employed that the supporting table includes a reading/writing means for reading information of the information medium attached to each pallet supported at the supporting position or writing information in the information medium.

According to this configuration, since the information (information on empty or not, information relating to the type of the article to be loaded and the like, for example) of the information medium attached to each pallet supported at the supporting position on the supporting table can be read by the reading/writing means, the storage processing of the article can be performed smoothly on the basis of the information obtained by the reading/writing means, and information can be newly written in the information medium by the reading/writing means, in such a case that the pallet having been carried out in the middle of the transfer processing is carried in again and returned onto the supporting table, optimal storage processing can be applied by checking (reading) its history.

Also, by writing predetermined information also in the information medium attached to the pallet, even if a computer for management fails, full loss of data such as storage information can be prevented, and the subsequent storage processing can be performed surely.

A storage method of the present invention in order to achieve the above object is a storage method for carrying in an article by a carrying-in line, transferring and storing the carried-in article to a storage area or carrying out the article corresponding to a request by a transfer mechanism, which includes an address-space setting step for setting address spaces corresponding to a plurality of pallets supported by a supporting table defining the storage area, a reading step of an article for reading information relating to the article which has been carried in by the carrying-in line, and a carrying-in/transfer step for transferring the article onto a predetermined pallet on the supporting table by the transfer mechanism on the basis of the information obtained by the reading step of an article and the address-space setting step.

According to this configuration, at the address-space setting step, a virtual address space corresponding to an actual storage space corresponding to the pallet is set by use of a control means such as a computer for management or the like, and when the information of the article which has been actually carried in is read (discriminated) at the reading step of an article, the article is transferred to a predetermined storage location (predetermined pallet on the supporting table) on the basis of the information of the article and the address space at the carrying-in/transfer step.

As a result, the storage processing of the article as a whole (sorting and transfer of the carried-in articles to the storage areas) can be performed in a well-planned way, without waste, efficiently and with high accuracy. Also, if a storage (allocated) location of the article is to be changed on the basis of a management plan of the articles, the allocation of the storage location can be easily changed at the address-space setting step.

In the storage method with the above configuration, such a configuration can be employed that the reading step of an article is performed at a taking-out position on the carrying-in line for taking out the article by the transfer mechanism.

According to this configuration, since the information of the article immediately before transfer to the storage area is read, the articles can be transferred to the corresponding storage area surely and with accuracy for storage on the basis of the information.

In the storage method with the above configuration, such a configuration can be employed that the address-space setting step updates information relating to the address space corresponding to the pallet on which the article has been transferred by the carrying-in/transfer step.

According to this configuration, since the article is transferred and the information relating to the address space is updated at the same time, the articles can be surely transferred onto a pallet with a limited capacity without overload, and loading information of the articles in the pallet can be managed with high accuracy.

In the storage method with the above configuration, such a configuration can be employed that the address-space setting step sets the address spaces corresponding to a plurality of pallets in advance in accordance with assumed types of the articles.

According to this configuration, by setting (allocating) the address spaces in advance according to the assumed type of the article, efficient storage processing can be executed in a well-planned way.

In the storage method with the above configuration, such a configuration can be employed that the address-space setting step sets the address spaces corresponding to the plurality of pallets on the basis of the type of the article which was transferred first.

According to this configuration, by setting (allocating) the address space on the basis of the type of the article which was loaded first, flexible storage processing corresponding to a time-dependent request each time can be performed.

In the storage method with the above configuration, such a configuration can be employed that a pallet carrying-out step for carrying out the article for which carrying-out is requested among the articles stored in the storage area by a carrying-out means for each pallet is included.

According to this configuration, since a pallet on which the article according to a request is loaded is carried out by the carrying-out means (carrying-out line, forklift and the like, for example), the storage processing including a flow of carrying-in, transfer, storage, carrying-out and the like can be continuously executed without delay.

Advantageous Effect of the Invention

According to the storage system and the storage method with the above configuration, while space saving of an installation area, size reduction, simplification of a structure and the like are achieved, the processing till the articles (a product such as tire, for example) are carried in and stored and the processing for carrying out the stored articles according to a request can be performed efficiently, the storage processing efficiency can be improved as a whole, and various and diversified articles can be sorted by the type and stored surely, and moreover, the stored articles can be easily and correctly taken out according to a request.

EXPLANATIONS OF LETTERS OR NUMERALS

Figure 1:
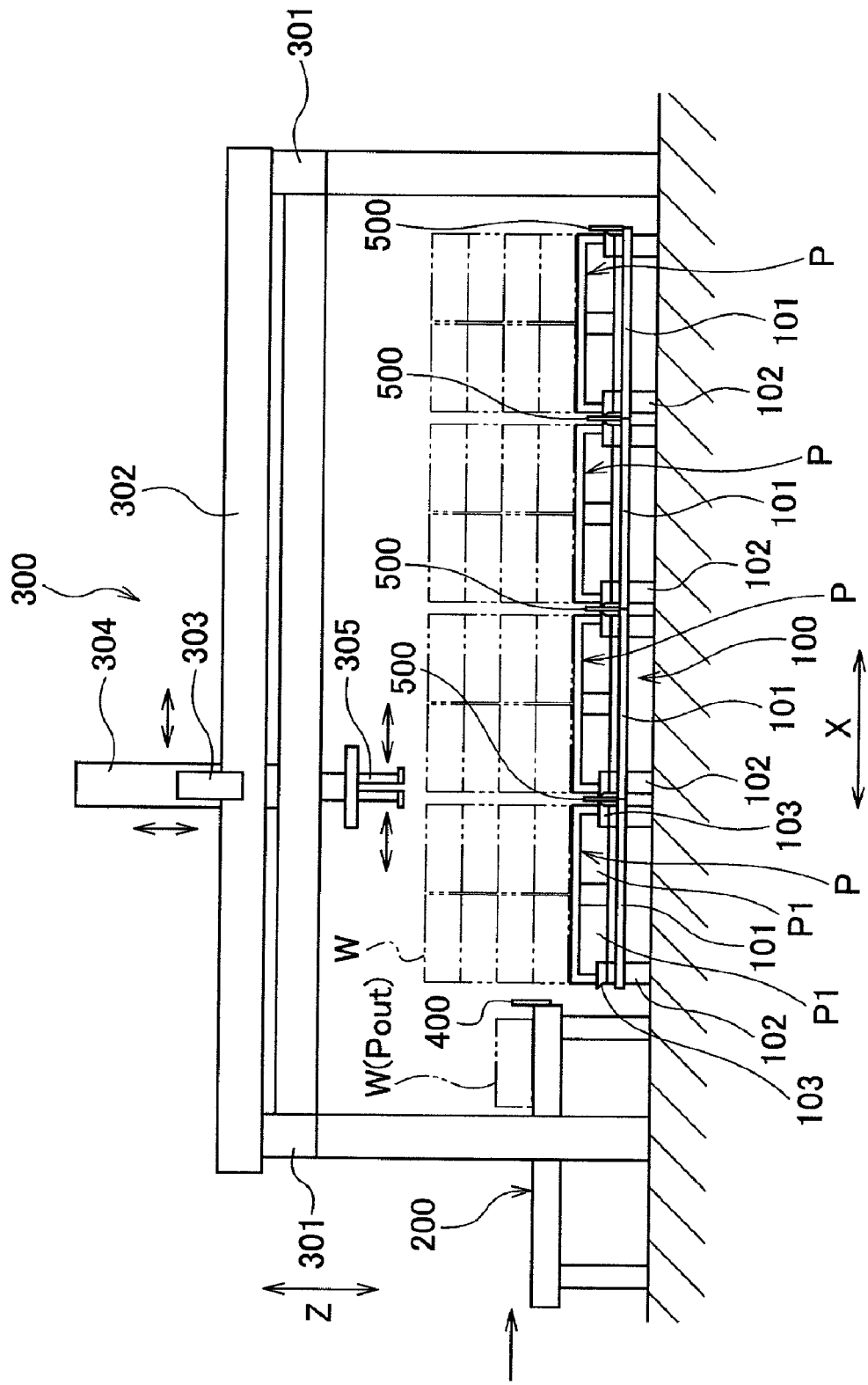
FIG. 1 is a front view illustrating an embodiment of a storage system according to the present invention.

P pallet
FL forklift (carrying-out means)
100, 100', 100" supporting table (storage area)
101 supporting portion (supporting position)
101' supporting portion
101a' pair of supporting belt (driving unit)
101b' driving motor (driving unit)
102 leg portion
103, 103' positioning portion
200, 200', 200", 200''', 210' carrying-in line
S feeding face
Pout taking-out position
300, 300' transfer mechanism
301 fixed frame
302, 302' movable frame
303, 303' slider
304 elevating arm
305 holding unit
400 reading sensor (reading means)
500 reading/writing unit (reading/writing means)
600, 600' pallet conveying line
601, 601' movable unit
601a' pair of supporting belt (driving unit)
602 guide rail
603 pallet carrying-in unit
604 pallet carrying-out unit (carrying-out means)

BEST MODE FOR CARRYING OUT THE INVENTION

A preferred embodiment of the present invention will be described below referring to the attached drawings.

Figure 2:
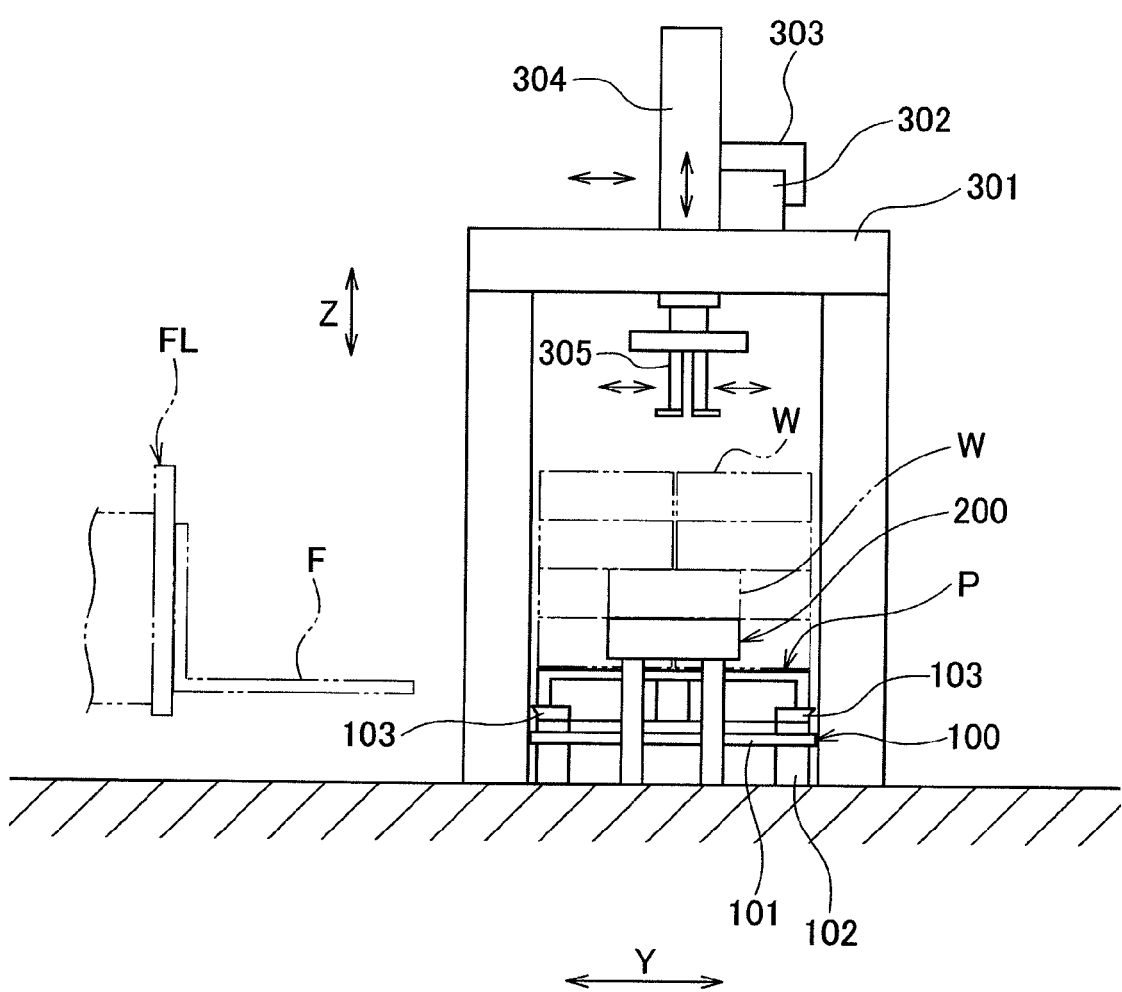
FIG. 2 is a side view of the storage system shown in FIG. 1.
Figure 3:
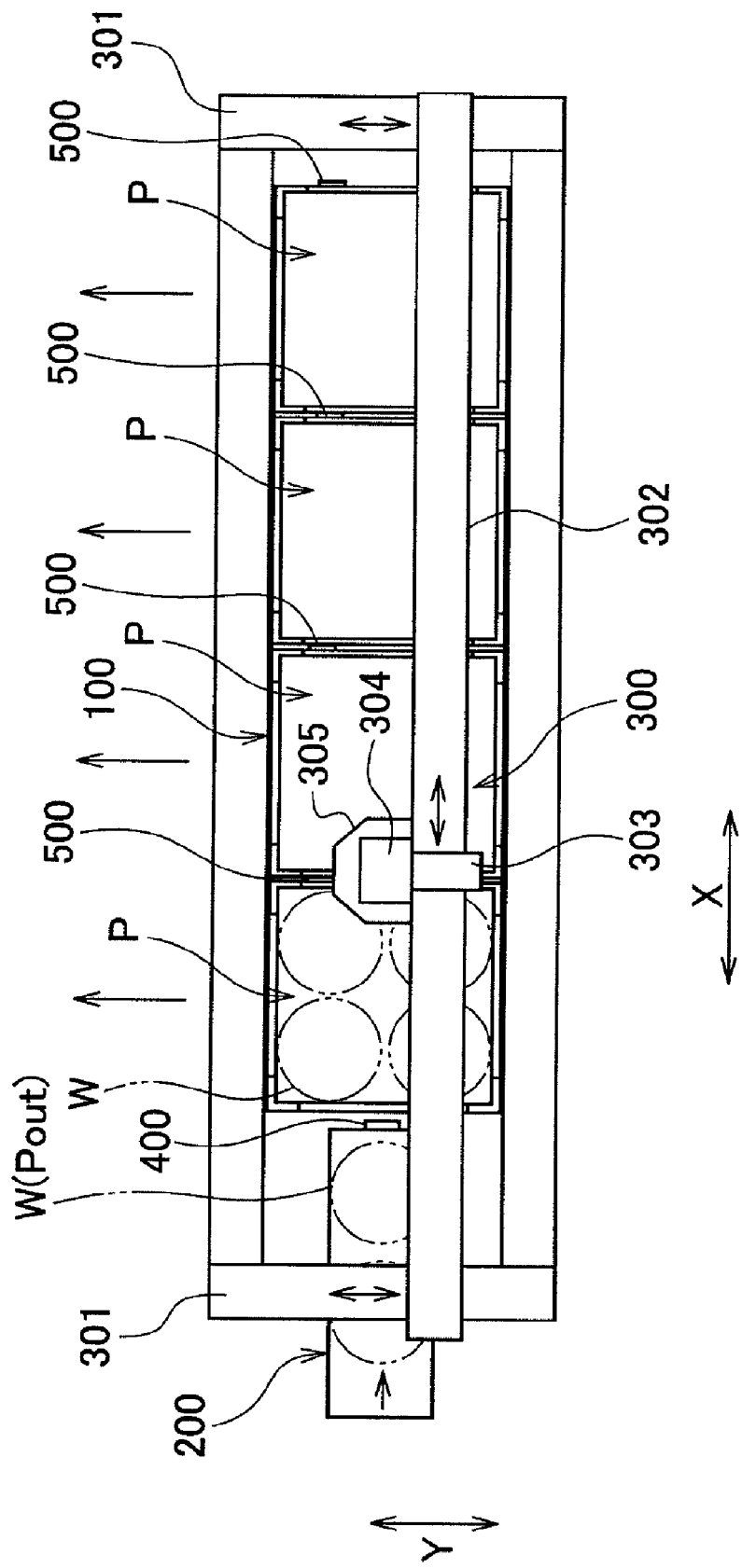
FIG. 3 is a plan view of the storage system shown in FIG. 1.

This storage system is, as shown in FIGS. 1 to 3, provided with a supporting table 100 as a storage area for arranging and storing an article W (a tire, here), a carrying-in line 200 for carrying in the article W toward the supporting table 100, a transfer mechanism 300 arranged on an upper region (ceiling region) of the supporting table 100 for transferring the article W having been carried in by the carrying-in line 200 onto the supporting table 100, a reading sensor 400 as a reading means for reading information of an information medium attached to the article W at a taking-out position Pout on the carrying-in line 100, a reading/writing unit 500 as a reading/writing means for reading information of the information medium attached to a pallet P or writing information in the information medium on the supporting table 100, a computer (not shown) governing various controls relating to the storage and the like.

Here, the pallet P is formed, as shown in FIGS. 1 to 3, with a size that the articles W can be stacked and loaded in two rows in the X direction, two rows in the Y direction and plural stages (four stages, for example) in the vertical direction Z, and a hollow portion is formed below it so that a fork F (See FIG. 2) of a forklift FL can be inserted/withdrawn in the Y direction.

Also, a recording card (not shown) as an information medium in which loading information of the article W is written is mounted on (attached to) the pallet P. This recording card is used for automatic information rewriting or the like by a manual operation of an operator or on the basis of read-out information through the computer.

Here, in the recording card, information relating on whether the article W is loaded or not (or full or not), information relating to the type of the loaded article W and the like is written, for example.

Also, to the article W, a read label (not shown) as an information medium in which the information relating to the type (information on an applicable target, size, material and the like, for example) is written is affixed. The read label has the information relating to the article W described by barcode or the like.

The supporting table 100 is, as shown in FIGS. 1 to 3, 4A and 4B, composed of four supporting portions 101 arranging and supporting four pallets P in the X direction within a horizontal plane, leg portions 102 for supporting the supporting portions 101 at a predetermined height position, positioning portions 103 for guiding the pallet P to a supporting face 101 and positioning it in the horizontal direction and the like.

Figure 4A:
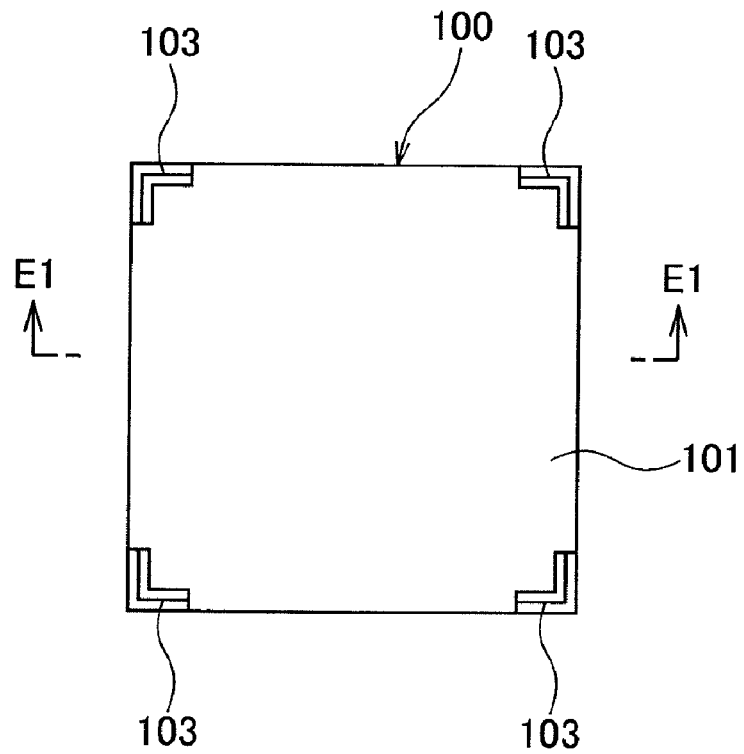
FIG. 4A is a plan view illustrating a supporting table constituting a part of the storage system shown in FIG. 1.
Figure 4B:
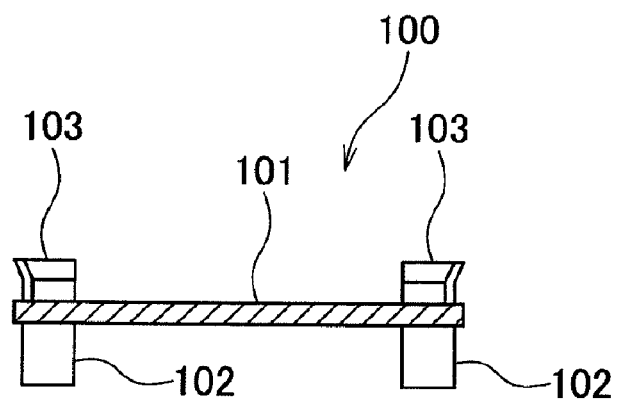
FIG. 4B is a sectional view of the supporting table by E1-E1 in FIG. 4A.

The four supporting portions 101 are formed, as shown in FIGS. 4A and 4B, in a rectangular shape seen from above, respectively.

The four positioning portions 103 are formed at four corners of each of the supporting portions 101 and are formed to be inclined upward to expand toward the top end so as to guide the pallet P lowered and loaded from above toward the supporting portion 101 and to stand upright so as to position the pallet in the horizontal direction.

The carrying-in line 200 is arranged, as shown in FIGS. 1 to 3, so as to be adjacent to the substantially center in the Y direction on one end side in the X direction of the supporting table 100 and formed so that the feeding direction extends in the X direction.

As the carrying-in line 200, a belt conveyer, a roller conveyer, a traverser, a transfer machine and the like can be applied and the carrying-in line is formed so that the article W is fed from the left side to the right side in FIG. 1. In a downstream-end region in the feeding direction (X direction) on the carrying-in line 200, the taking-out position Pout where the article W is taken out by the transfer mechanism 300, which will be described later, is defined.

The transfer mechanism 300 is, as shown in FIGS. 1 to 3, composed of a gate-like fixed frame 301 formed so as to extend in the X direction and the Y direction in the upper region (ceiling region) of the supporting table 100, a movable frame 302 movably supported in the Y direction with respect to the fixed frame 301, a slider 303 movably supported in the X direction with respect to the movable frame 302, an elevating arm 304 supported capable of elevation in the vertical direction Z with respect to the slider 303, a holding unit 305 provided at a lower end of the elevating arm 304 so as to hold the article W and the like.

The movable frame 302 is driven to a predetermined position in the Y direction by a lead screw mechanism composed of a ball screw (not shown) provided along the fixed frame 301 extending in the Y direction, a screwed portion (not shown) provided on the movable frame 302 and screwed with the ball screw, a motor (not shown) provided on the fixed frame 301 so as to rotate and drive the ball screw and the like; a rack and pinion mechanism composed of a pinion rack (not shown) provided along the fixed frame 302 extending in the Y direction, a pinion gear (not shown) provided on the movable frame 302 and engaging with the pinion rack, a motor (not shown) provided on the movable frame 302 so as to rotate and drive the pinion gear; an actuator telescopically moved by a pneumatic pressure and the like; or the like.

The slider 303 is driven to a predetermined position in the X direction by a lead screw mechanism composed of a ball screw (not shown) provided so as to extend in the X direction in the movable frame 302, a screwed portion (not shown) provided on the slider 303 and screwed with the ball screw, a motor (not shown) provided on the movable frame 302 so as to rotate and drive the ball screw and the like; a rack and pinion mechanism composed of a pinion rack (not shown) provided so as to extend in the X direction in the movable frame 302, a pinion gear (not shown) provided on the slider 303 and engaging with the pinion rack, a motor (not shown) provided on the slider 303 so as to rotate and drive the pinion gear; an actuator telescopically moved by a pneumatic pressure and the like; or the like.

The elevating arm 304 is driven to a predetermined position in the vertical direction Z by a lead screw mechanism composed of a ball screw (not shown) provided so as to extend in the vertical direction Z in the slider 303, a screwed portion (not shown) provided on the elevating arm 304 and screwed with the ball screw, a motor (not shown) provided on the slider 303 so as to rotate and drive the ball screw and the like; a rack and pinion mechanism composed of a pinion rack (not shown) provided so as to extend in the vertical direction Z in the slider 303, a pinion gear (not shown) provided on the slider 303 and engaging with the pinion rack, a motor (not shown) provided on the slider 303 so as to rotate and drive the pinion gear; an actuator telescopically moved by a pneumatic pressure and the like; or the like.

The holding unit 305 has a pair of claws driven so as to be brought close to or separated from each other in the X direction by a driving mechanism (not shown) provided at a lower end of the elevating arm 304 so that the pair of claws are separated to hold (grasp) the articles W, while the pair of claws are brought close to release the articles W. As the holding unit 305, other means may be employed.

The reading sensor 400 is, as shown in FIG. 3, provided at an end portion adjacent to the taking-out position Pout of the carrying-in line 100. The reading sensor 400 reads a read label of the article W having been carried into the taking-out position Pout, and read-out information of the read label is managed in a centralized manner in the computer. Here, as the reading sensor 400, a non-contact type optical sensor, a magnetic sensor and the like can be applied.

The reading/writing unit 500 is, as shown in FIG. 3, provided on a side part adjacent to each of the supporting positions (supporting portions 101) on the supporting table 100. The reading/writing unit 500 reads the recording card of the pallet P supported at the supporting position (supporting portion 101), and the read-out information of the recording card is managed in a centralized manner in the computer. The reading/writing unit 500 can update the recorded information by newly writing information. Here, as the reading/writing unit 500, a non-contact type optical pickup sensor, a magnetic pickup sensor, an electric-wave pickup sensor (RFID or the like) and the like can be applied.

Subsequently, an operation of the storage system will be described referring to FIGS. 5 to 7.

Here, the information relating to the supporting position (each supporting portion 101) on the supporting table 100 has been inputted in the computer in advance in the form of coordinates (X1, Y1), (X2, Y1), (X3, Y1), (X4, Y1).

Figure 5:
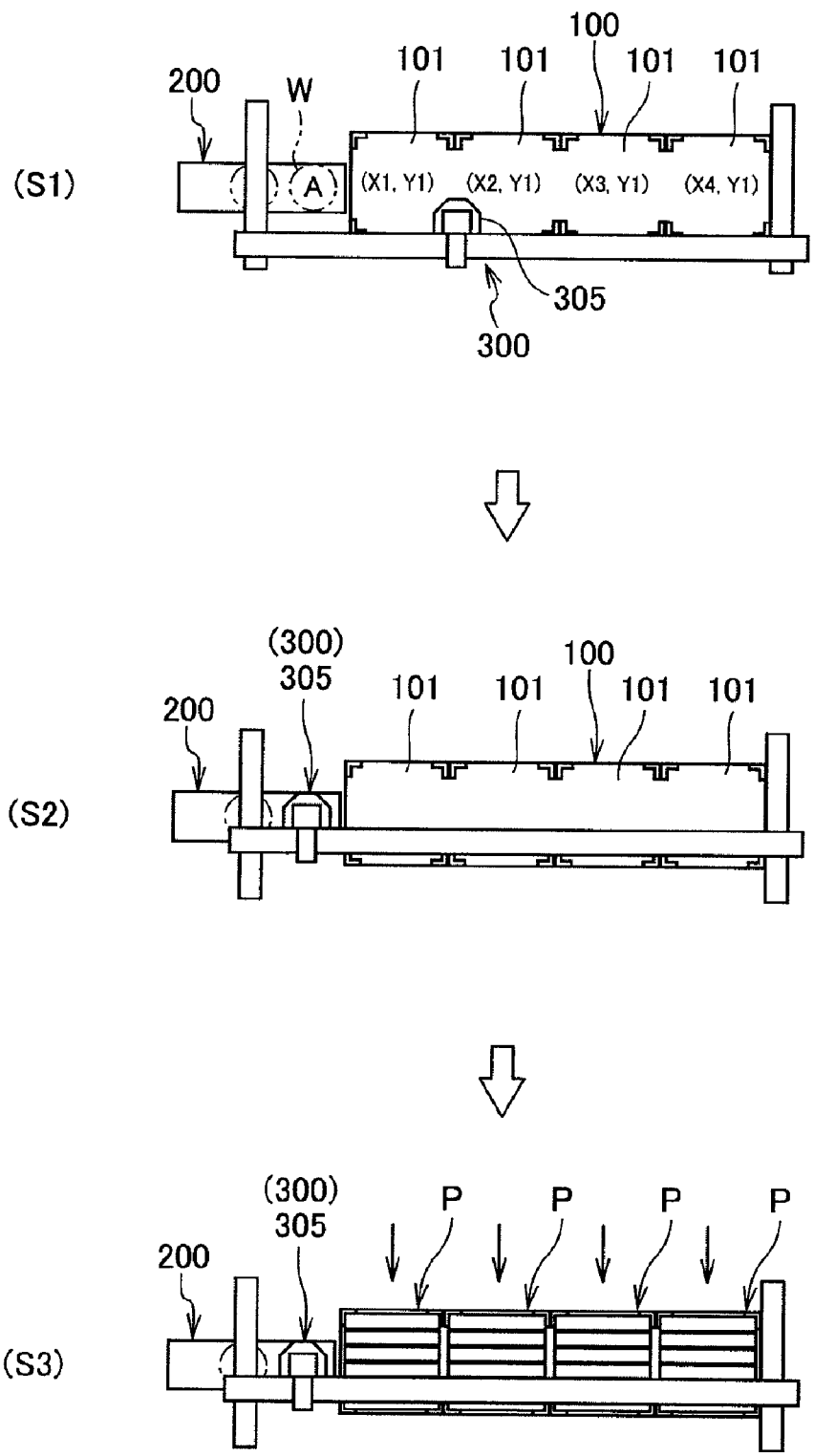
FIG. 5 is an operation diagram for explaining an operation of the storage system shown in FIGS. 1 to 3.

First, as shown in (S1) in FIG. 5, the article W is carried into the predetermined taking-out position Pout by the carrying-in line 200. Then, the reading sensor 400 reads the read label affixed to the article W. That is, a reading step of an article for reading the information relating to the article W having been carried in by the carrying-in line 200 is executed by the reading sensor 400.

As mentioned above, since the reading step of an article is executed at the taking-out position Pout on the carrying-in line 200, that is, the information of the article W is read out immediately before transfer to the storage area (pallet P on the supporting table 100), the article W can be transferred and stored at the corresponding storage area surely and with high accuracy on the basis of the information.

Subsequently, the holding unit 305 of the transfer mechanism 300 is moved from a standby position and positioned above the taking-out position Pout as shown in (S2) in FIG. 5.

Subsequently, by the outside forklift FL, as shown in (S3) in FIG. 5, the four empty pallets P are carried into the four supporting portions 101 on the supporting table 100. At this carrying-in, each pallet P is guided by the positioning portions 103 and smoothly positioned on the supporting portion 101 and supported.

Subsequently, the reading/writing unit 500 reads the recording cards provided on the four pallets P supported at the four supporting positions on the supporting table 100 (storage area) and on the basis of the read-out information, an address-space setting step for setting address spaces corresponding to the four pallets P is executed by a computer.

Here, information that no article W is loaded on the four pallets P and the pallet is empty is written in the recording card in advance.

The carrying-in operation of the pallet P may be performed prior to the carrying-in of the article W.

Subsequently, the holding unit 305 of the transfer mechanism 300 is lowered to hold the article W and take it out of the carrying-in line 200 and lifts it to a predetermined height. Then, the holding unit 305 of the transfer mechanism 300 is moved two-dimensionally in the XY plane on the basis of a command signal of the computer, and as shown in (S4) in FIG. 6, the unit is moved and lowered to immediately above the pallet P located at a predetermined position (here, a coordinate (X2, Y1), and actually, more predetermined coordinates are allocated according to the size of the article W (tire) and here, any of positions (a1, a2, a3, a4) at which the four articles W (tires) are to be loaded) so as to transfer the article W onto the pallet P.

Figure 6:
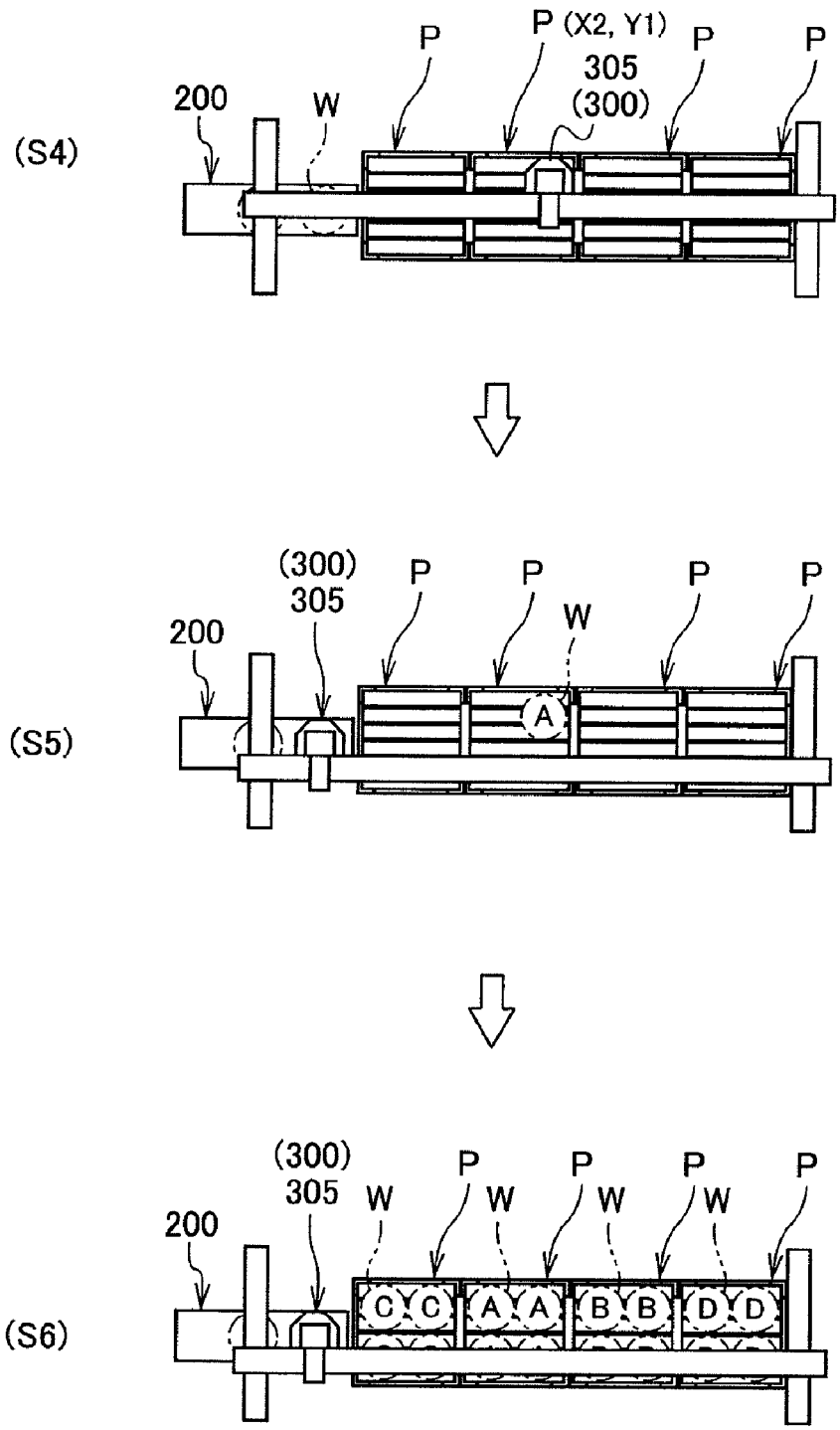
FIG. 6 is an operation diagram for explaining an operation of the storage system shown in FIGS. 1 to 3.

Here, as shown in (S5) in FIG. 6, the type of the article W stored on the pallet P at the coordinate (X2, Y1) is type A, and the articles W of type A are also loaded to the remaining three loading spaces on this pallet P.

That is, here, the address-space setting step for setting the address spaces corresponding to the four pallets P on the basis of the type of the article W which was transferred first is performed.

As mentioned above, by setting (allocating) the address spaces on the basis of the type of the article W which was loaded first, the flexible storage processing corresponding to time-dependent request or the like each time can be performed.

The transfer mechanism 300 (holding unit 305) similarly transfers the articles W of type A onto the pallet P at the coordinate (X2, Y1) as shown in (S6) in FIG. 6 and transfers the articles W of the types C, B, D onto the pallets P at the coordinates (X1, Y1), (X3, Y1), (X4, Y1), respectively. That is, on the basis of the information obtained from the reading step of an article and the address-space setting step, the carrying-in/transfer step for transferring the article W onto the pallet P on the supporting table 100 by the transfer mechanism 300 is performed.

Then, the supporting table 100 stores 64 pieces (16×4 pieces) in total of the articles W on the four pallets P, respectively, in a state in which the articles W in 2×2 are stacked in plural stages (4 stages).

With regard to the pallet P onto which the article W was transferred by the carrying-in/transfer step, the information relating to the address space is updated at the address-space setting step.

According to the above, since the article W is transferred and the information relating to the address space is updated at the same time, the articles W can be surely transferred onto the pallet P with a limited capacity without overload, and the loading information of the articles W in the pallet P can be managed with high accuracy.

Figure 7:
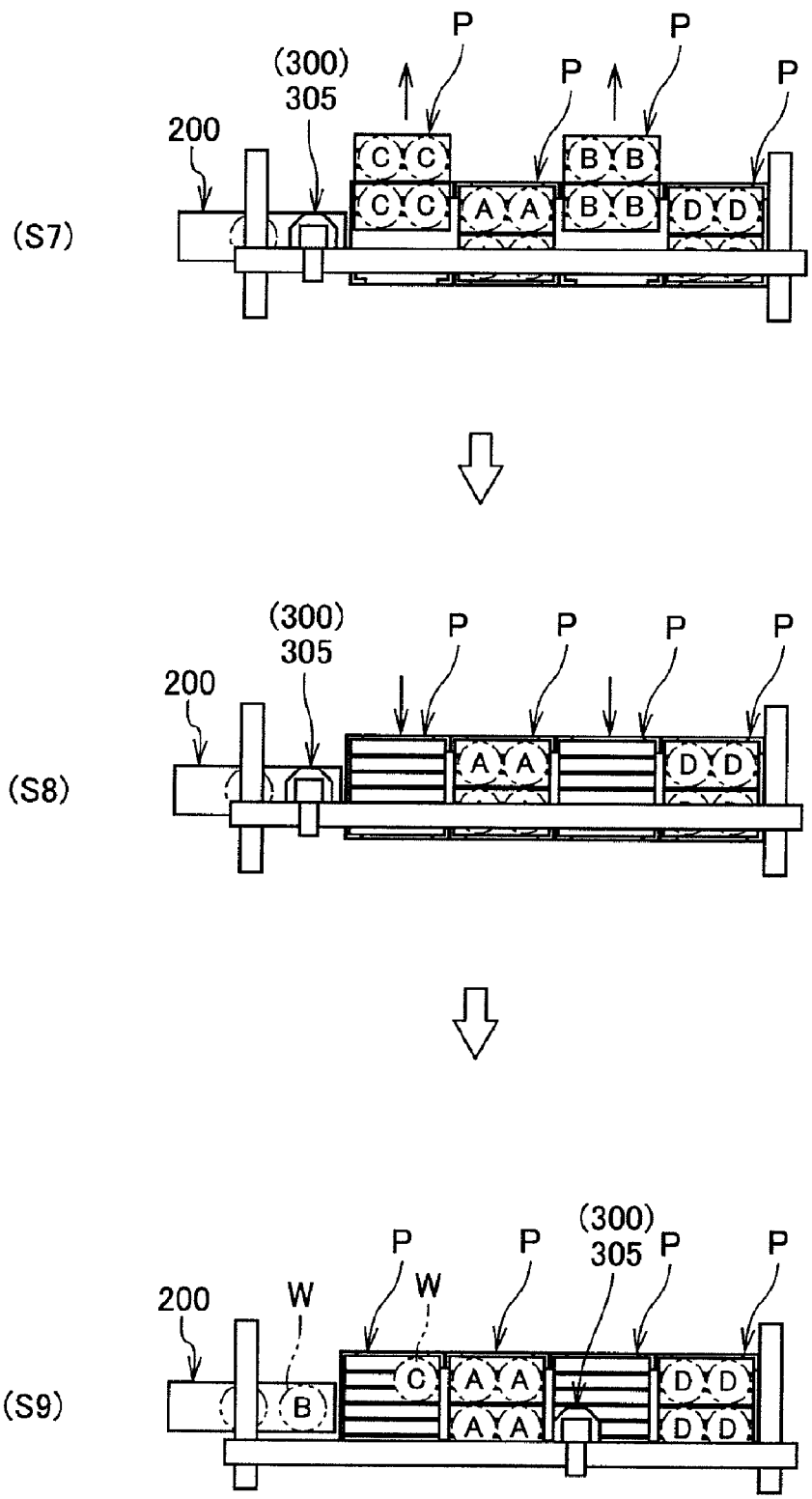
FIG. 7 is an operation diagram for explaining an operation of the storage system shown in FIGS. 1 to 3.

When a delivery request for the article W of the type C and the type B is made, for example, as shown in (S7) in FIG. 7, the corresponding two pallets P are lifted by the outside forklift FL and carried out of the supporting table 100.

After that, prior to the carrying-in and storage of a new article W, the two empty pallets P are similarly carried in and supported by the outside forklift FL at the corresponding supporting portion 101 (supporting position) on the supporting table 100 as shown in (S8) in FIG. 7.

Then, similarly to the above, the reading/writing unit 500 reads the recording cards of the two pallets P newly supported at the two supporting positions on the supporting table 100 (storage area). That is, on the basis of the information obtained by the reading/writing unit 500, the address-space setting step for setting the address spaces corresponding to the two pallets P is executed by the computer.

After that, to the empty pallets P, as shown in (S9) in FIG. 7, the articles W (the articles W of types C and B, for example) are transferred and stored according to the procedure similar to the above.

According to the storage system, since the supporting table 100 for arranging and supporting the plurality of pallets P on which the articles W can be loaded is employed as a storage area, the transfer mechanism 300 transfers the articles W to the pallet P supported on the supporting table 100, and the articles W are stored in the stacked state on the pallet P, when the articles W are to be taken out according to the delivery request, the articles can be taken out for each pallet P by use of a carrying-out means such as the forklift FL or the like from the outside, there is no need to transfer the article directly stored on the floor face as before to the pallet any more, by which the carrying-out processing is simplified, and efficiency of the storage processing of the articles W as a whole (carrying-in from the outside, transfer to the storage area, carrying-out to the outside) is improved.

If the storage (allocation) location of the article W is to be changed on the basis of the management plan of the articles W, the storage (allocation) location can be easily changed by taking in/out each pallet P on which the articles W are loaded with respect to the supporting position on the supporting table 100.

Figure 8:
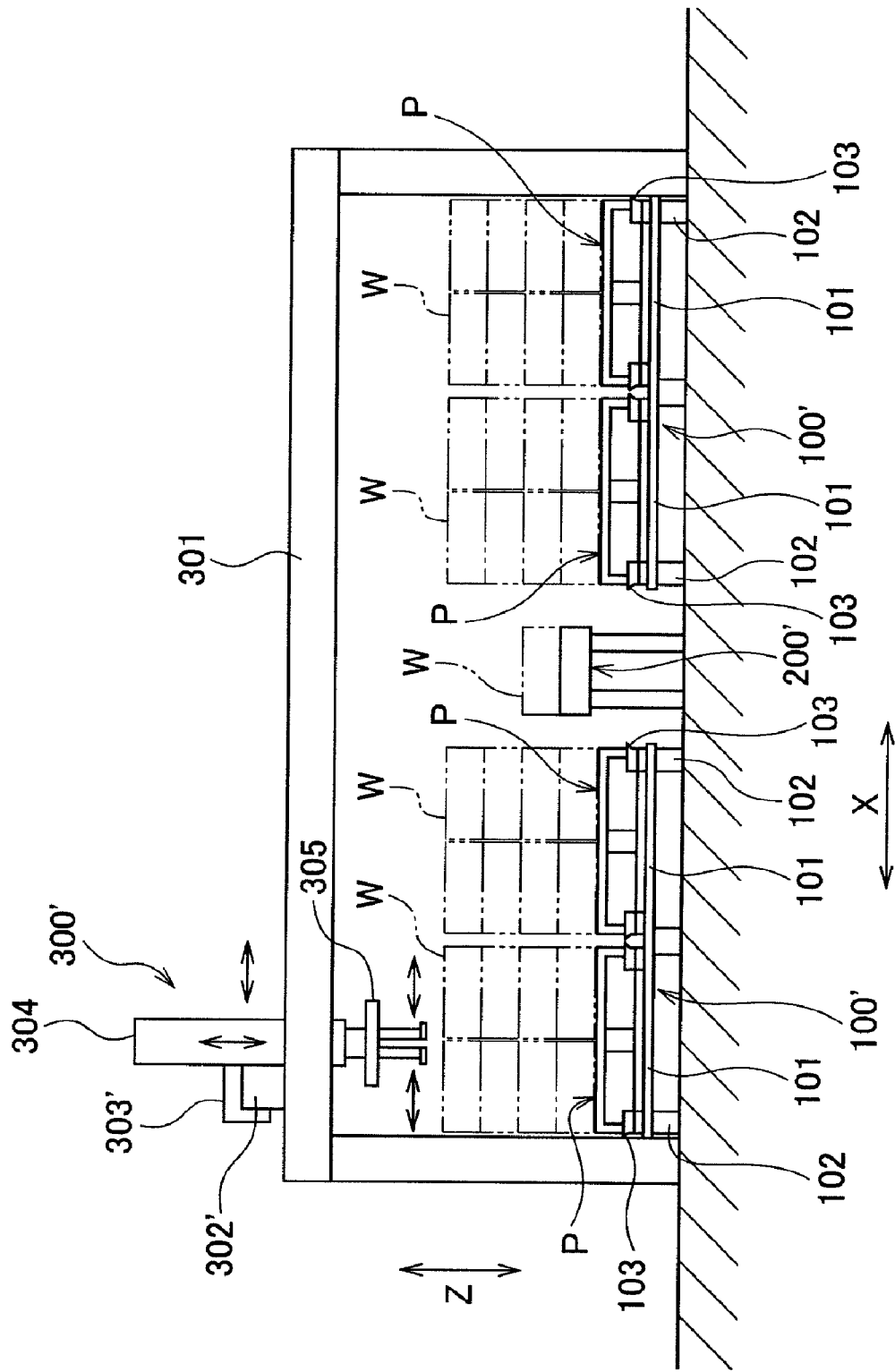
FIG. 8 is a front view illustrating another embodiment of the storage system according to the present invention.
Figure 9:
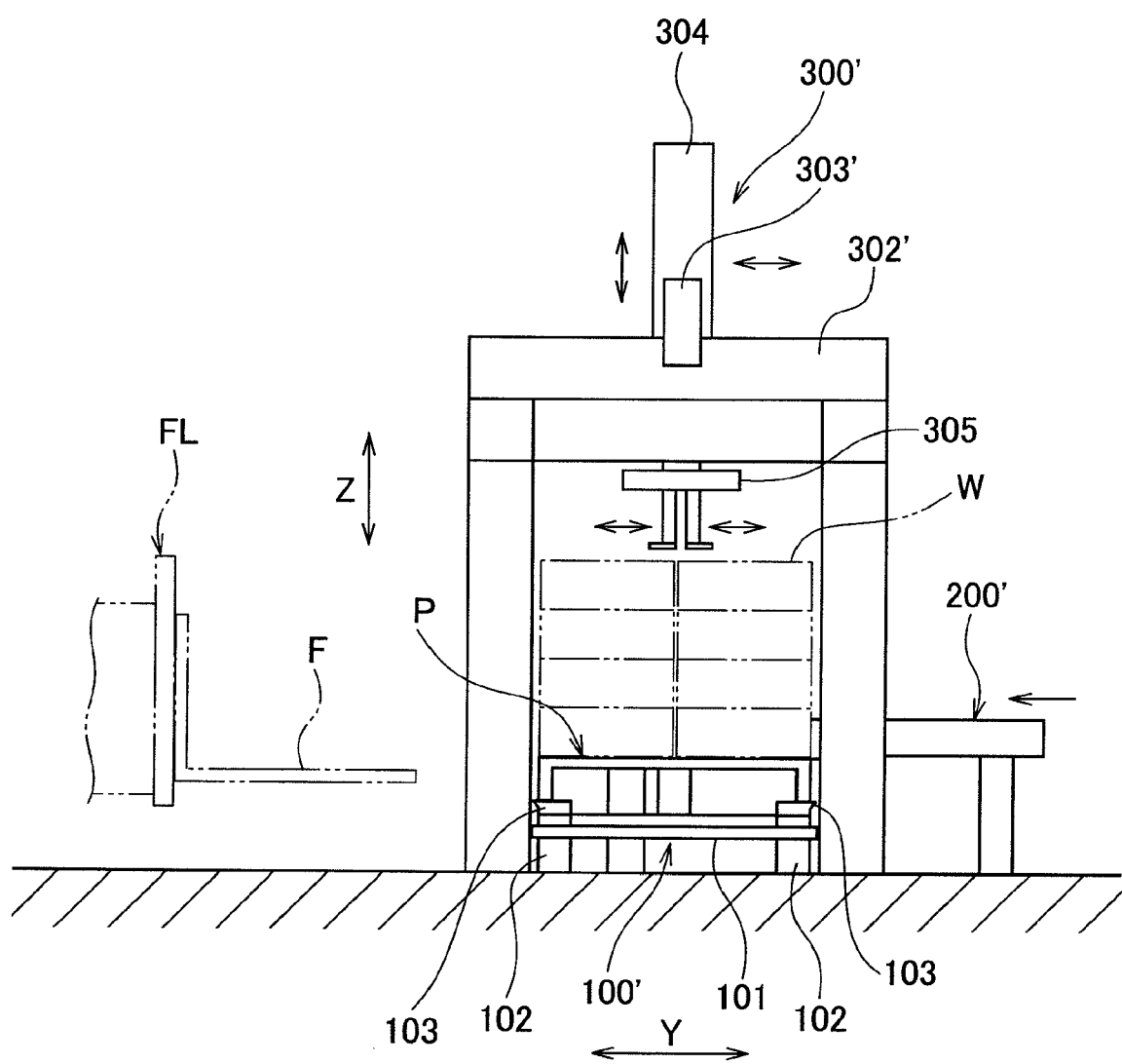
FIG. 9 is a side view of the storage system shown in FIG. 8.
Figure 10:
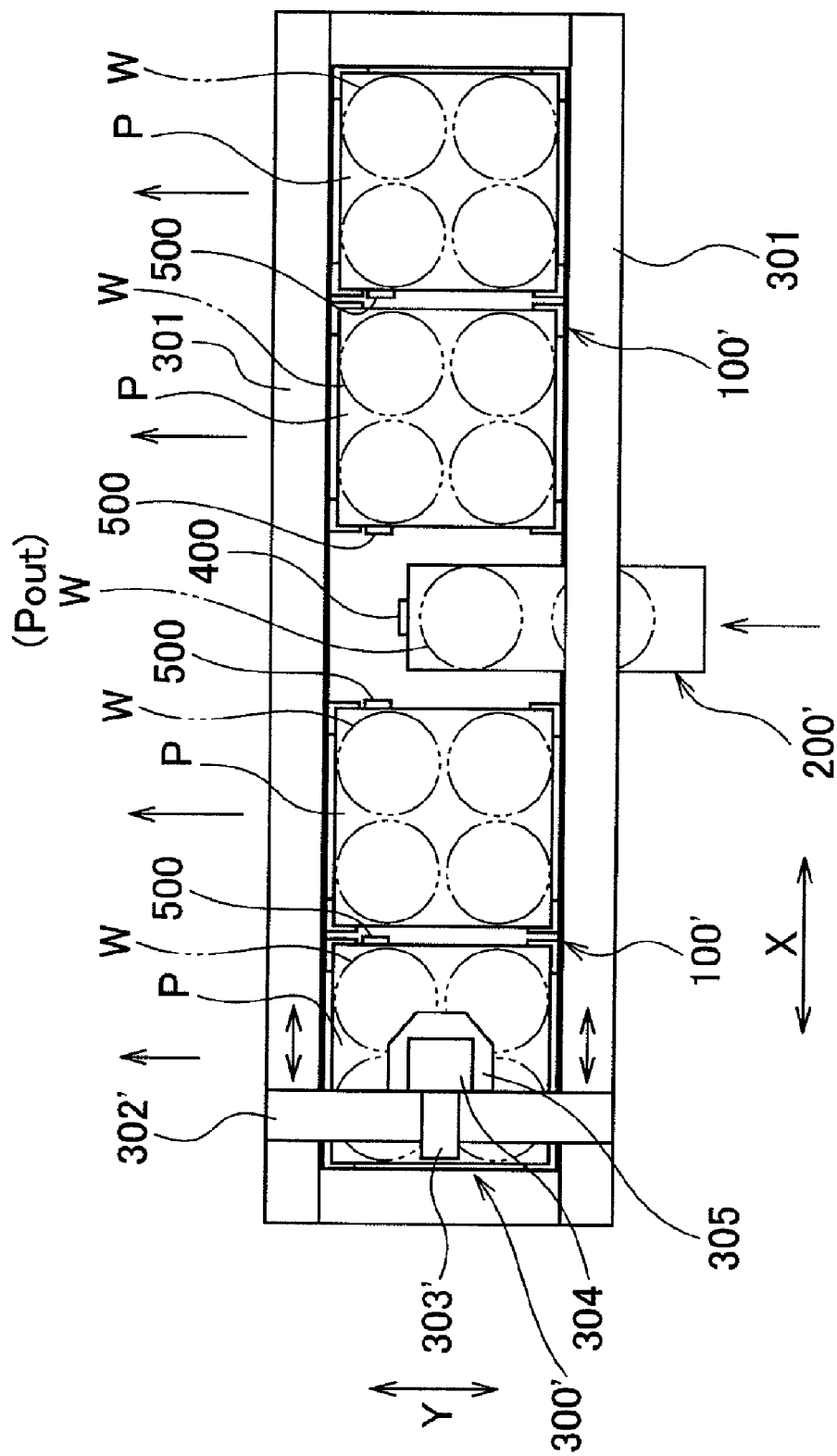
FIG. 10 is a plan view of the storage system shown in FIG. 8.

FIGS. 8 to 10 show another embodiment of the storage system according to the present invention, and the same reference numerals are given to the same configuration as that in the above embodiment, and the description will be omitted.

That is, this storage system is provided with, as shown in FIGS. 8 to 10, a pair of separated supporting tables 100' as a storage area, a carrying-in line 200' arranged between the pair of supporting tables 100', a transfer mechanism 300' arranged on an upper region (ceiling region) of the pair of supporting tables 100' and the like.

The pair of supporting tables 100' are, as shown in FIGS. 8 to 10, provided with two supporting portions 101, respectively. That is, they correspond to a form in which the supporting table 100 in the above-mentioned embodiment is separated from the center in the X direction.

The carrying-in line 200' is, as shown in FIGS. 8 to 10, arranged in a substantially center region between the pair of supporting tables 100' in the X direction and formed so that the feeding direction extends in the Y direction. That is, the pair of supporting tables 100' are arranged and provided on both sides in the horizontal direction (X direction) putting the carrying-in line 200' between them.

In a downstream end region in the feeding direction (Y direction) on the carrying-in line 200' (that is, at the substantially center position in the storage area), the taking-out position Pout where the article W is taken out by the transfer mechanism 300' is defined.

The transfer mechanism 300' is, as shown in FIGS. 8 to 10, provided with a movable frame 302' movably supported in the X direction with respect to the fixed frame 301 extending in the X direction, a slider 303' movably supported in the Y direction with respect to the movable frame 302', the elevating arm 304, the holding unit 305 and the like.

According to this storage system, since the supporting tables 100' are arranged on both sides so as to put the carrying-in line 200' between them, the articles W which have been carried in by the carrying-in line 200' can be sorted to the both sides for storage.

That is, the transfer mechanism 300' can perform a transfer operation symmetrically with respect to the substantially center position as the center in a short moving distance in order to take out the articles W at the substantially center position of the storage area and to transfer it onto the respective pallets P arranged on the both sides, and thus, the transfer time can be reduced, and the transfer efficiency can be further improved.

Since this operation in the storage system is substantially the same as the above-mentioned embodiment except that the transfer mechanism 300' sorts and transfers the taken-out articles W to both sides of the carrying-in line 200', the description here will be omitted.

Figure 11:
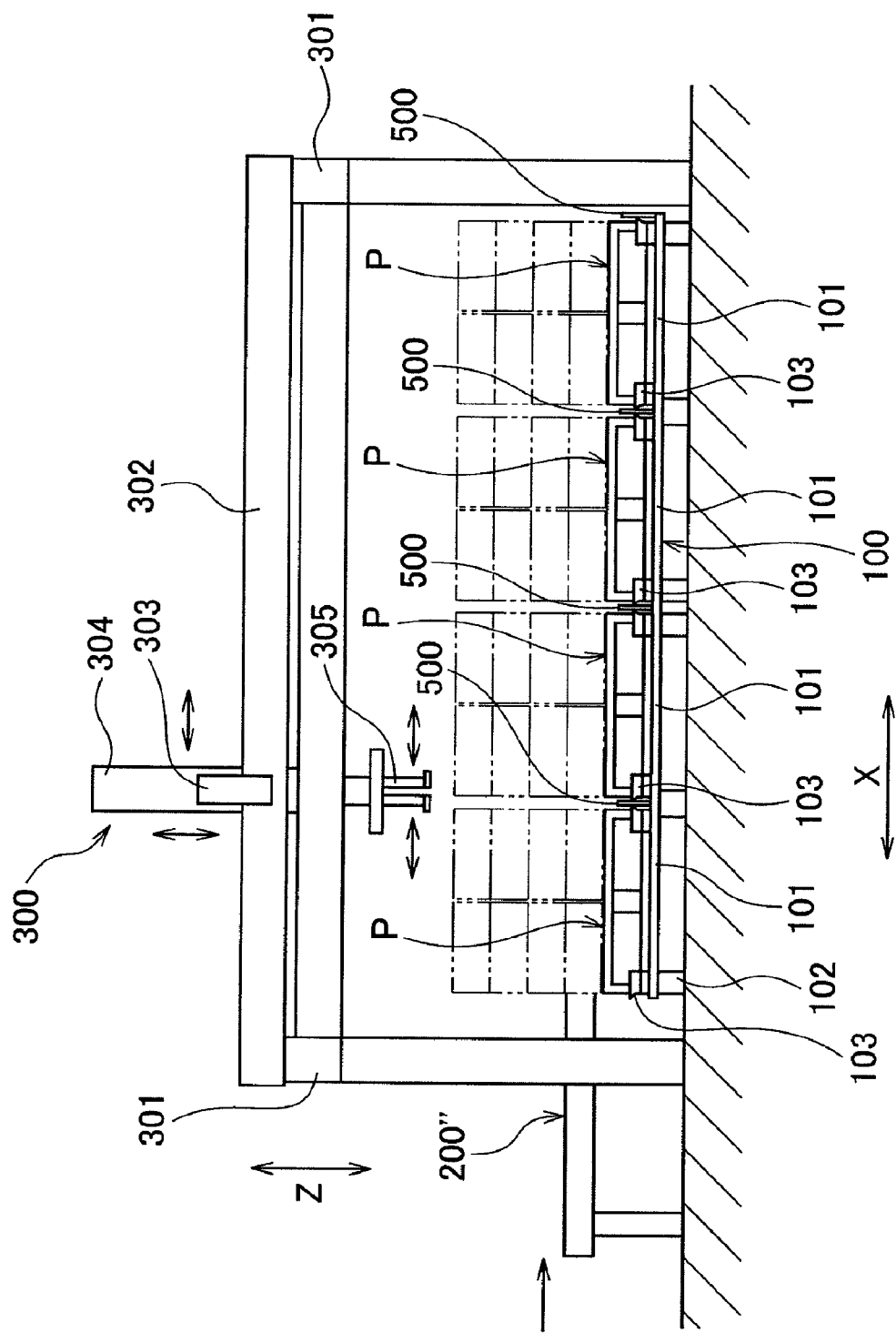
FIG. 11 is a front view illustrating still another embodiment of the storage system according to the present invention.
Figure 12:
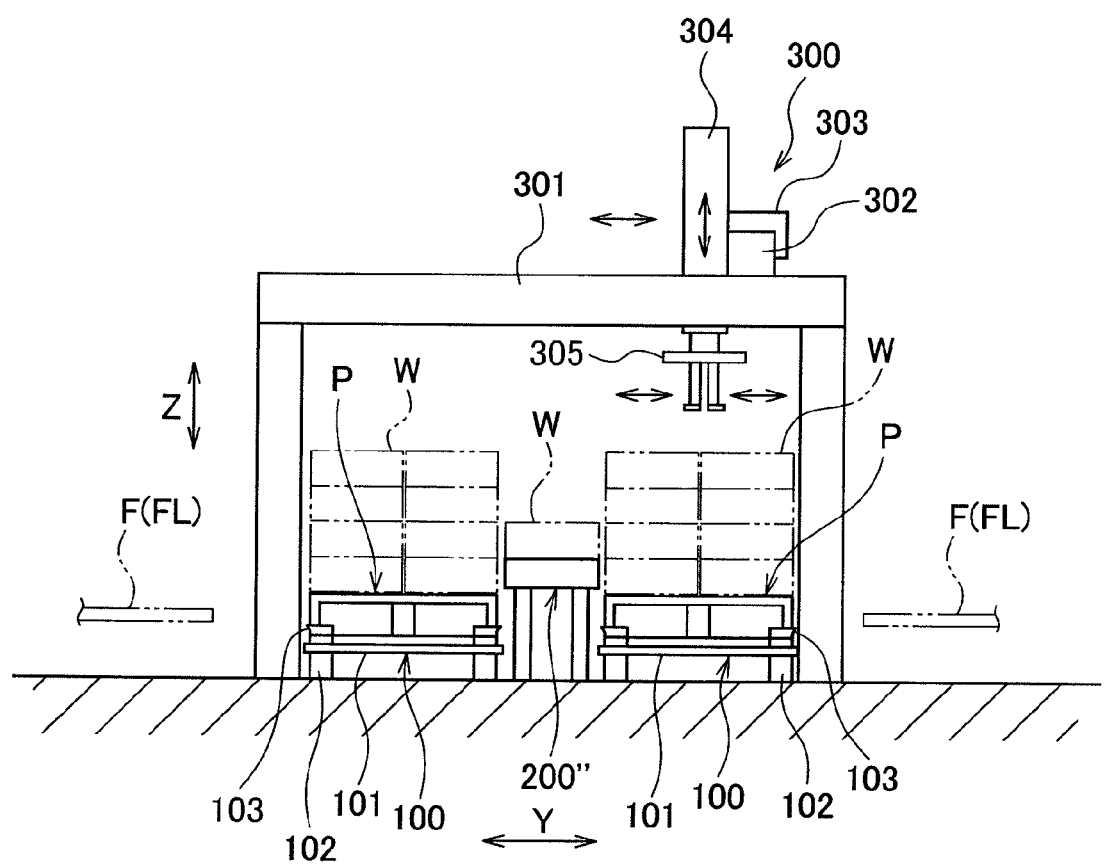
FIG. 12 is a side view of the storage system shown in FIG. 11.
Figure 13:
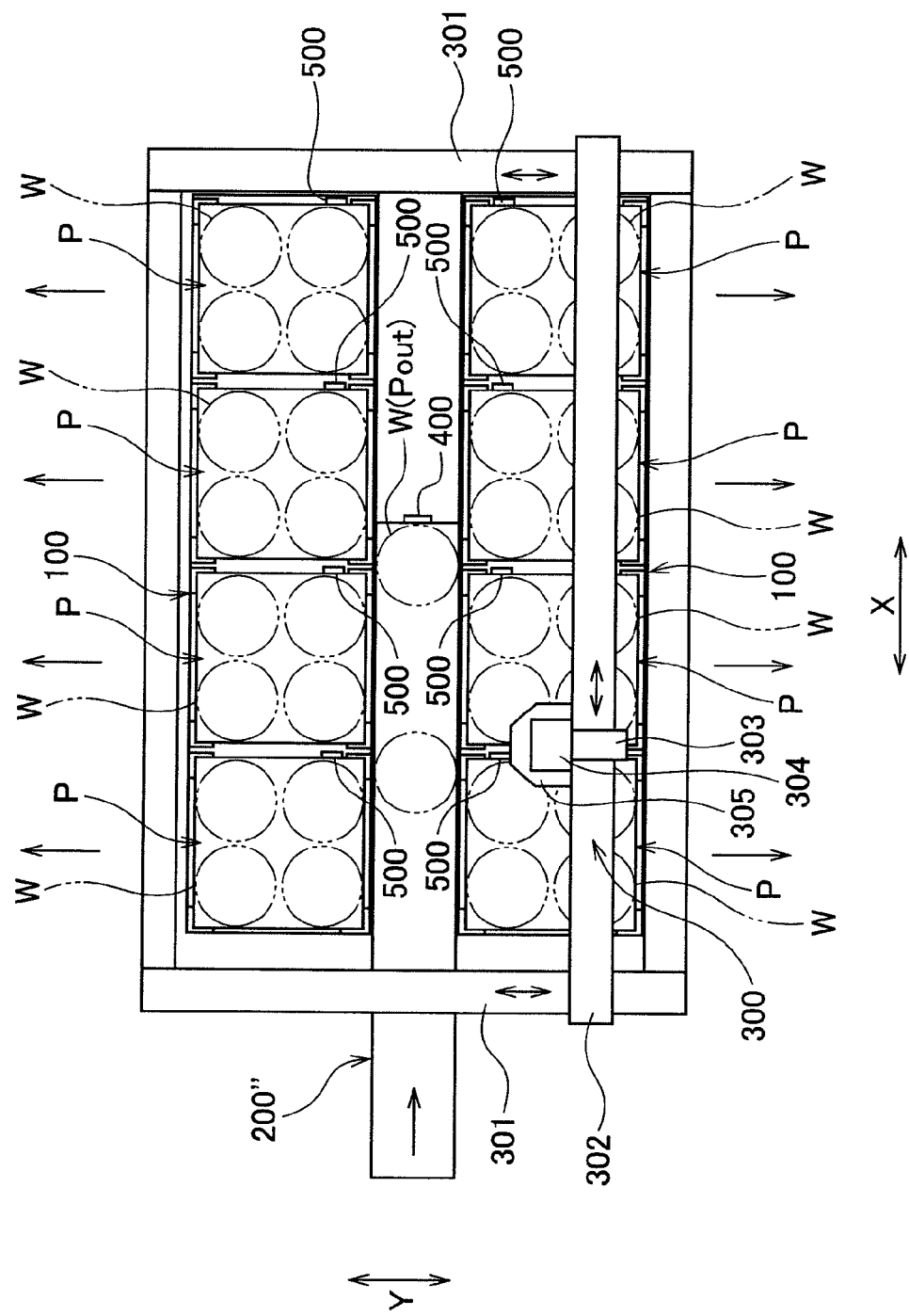
FIG. 13 is a plan view of the storage system shown in FIG. 11.

FIGS. 11 to 13 show still another embodiment of the storage system according to the present invention, and the same reference numerals are given to the same configuration as that in the above-mentioned embodiment and the description will be omitted.

That is, this storage system is, as shown in FIGS. 11 to 13, provided with two supporting tables 100 extending in the X direction, a carrying-in line 200" arranged so as to be put between the two supporting tables 100, the transfer mechanism 300 arranged on an upper region (ceiling region) of the two supporting tables 100 (storage areas) and the like.

The two supporting tables 100 have, as shown in FIGS. 12 and 13, four supporting portions 101 arranged in the X direction, respectively, and the four supporting portions 101 on one side and the four supporting portions 101 on the other side are arranged with a predetermined interval in the Y direction.

The carrying-in line 200" is, as shown in FIGS. 12 and 13, arranged in the substantially center region between the pair of supporting tables 100 in the Y direction and formed so that the feeding direction extends in the X direction. That is, the pair of supporting tables 100 are arranged and provided on the both sides in the horizontal direction (Y direction) putting the carrying-in line 200" between them.

In a downstream end region in the feeding direction (X direction) on the carrying-in line 200" (that is, the substantially center position in the storage area), the taking-out position Pout where the article W is taken out by the transfer mechanism 300 is defined.

Subsequently, an operation of the above storage system will be described referring to FIGS. 14 to 17.

Here, with regard to the information relating to the supporting position (each supporting portion 101) on the supporting table 100, coordinates (X1, Y1), (X2, Y1), (X3, Y1), (X4, Y1), (X1, Y2), (X2, Y2), (X3, Y2), (X4, Y2) are inputted in the computer in advance.

Figure 14:
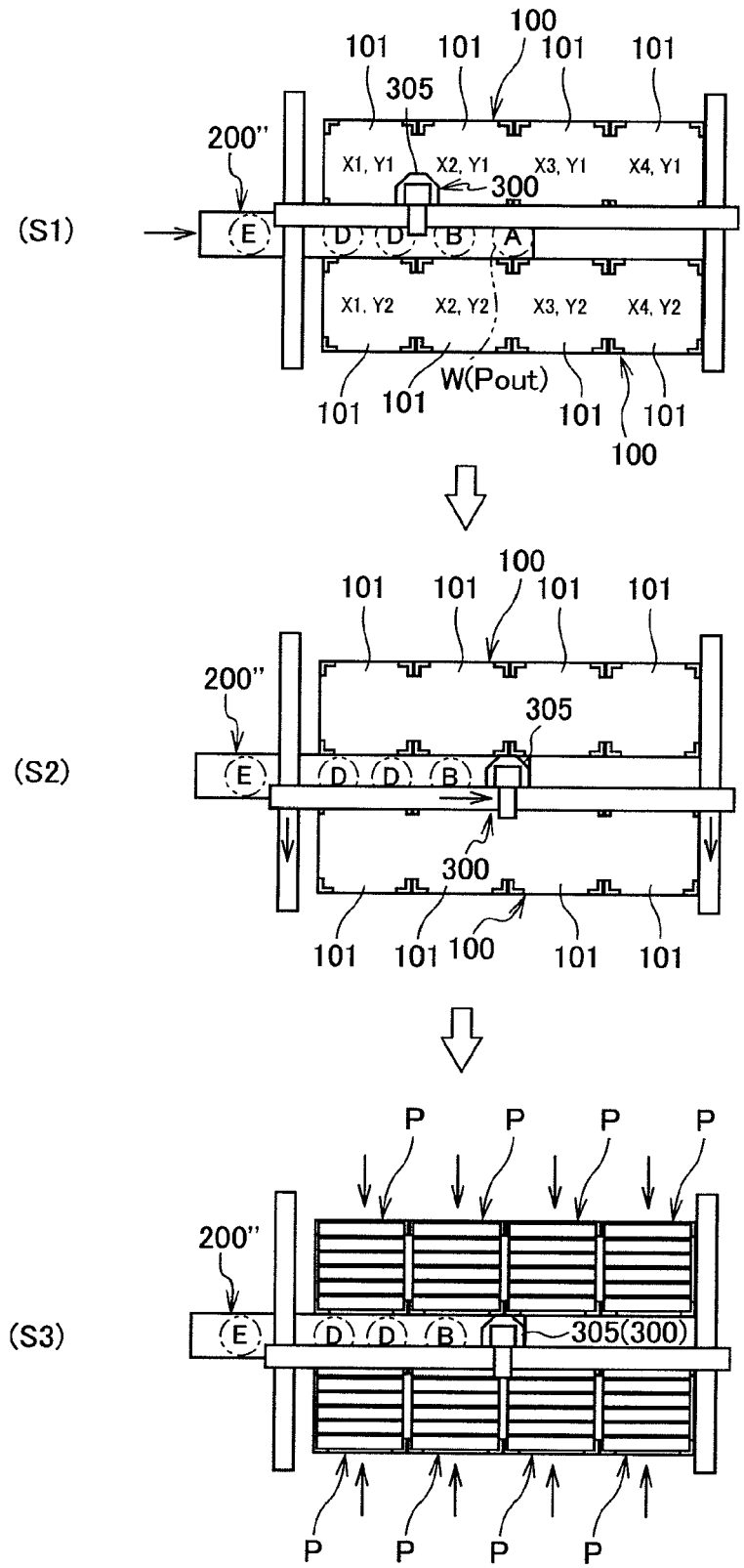
FIG. 14 is an operation diagram for explaining an operation of the storage system shown in FIGS. 11 to 13.

First, as shown in (S1) in FIG. 14, the article W is carried into the taking-out position Pout located at the substantially center of the storage area by the carrying-in line 200". Then, the reading sensor 400 reads the read label affixed to the article W. That is, the reading step of an article for reading the information relating to the article W carried in by the carrying-in line 200" is performed by the reading sensor 400.

The reading step of an article is performed as above at the taking-out position Pout on the carrying-in line 200". That is, since the information relating to the article W is read immediately before transfer to the storage area (pallet P on the supporting table 100), the article W can be transferred to and stored in the corresponding storage area assuredly and with high accuracy on basis of the information.

Subsequently, the holding unit 305 of the transfer mechanism 300 is, as shown in (S2) in FIG. 14, moved from the standby position and positioned above the taking-out position Pout.

Then, by the outside forklift FL, as shown in (S3) in FIG. 14, eight empty pallets P are carried into the eight supporting portions 101 (supporting positions) in total on the supporting tables 100 on both sides. In this carrying-in, each of the pallets P is guided by the positioning portion 103 and smoothly supported on the supporting portion 101 while being positioned.

Subsequently, the reading/writing unit 500 reads the recording cards provided on the eight pallets P supported at the eight supporting positions on the supporting tables 100 (storage areas), and the address-space setting step for setting the address space corresponding to the eight pallets P is executed by the computer on the basis of the read-out information.

Here, the information that no article W is loaded on the eight pallets P and the pallet is empty is written in the recording card in advance.

The carrying-in operation of the pallet P may be performed prior to the carrying-in of the article W.

Subsequently, the holding unit 305 of the transfer mechanism 300 is lowered to hold the article W and to take it out of the carrying-in line 200" at the same time and lift it to a predetermined height. Then, the holding unit 305 of the transfer mechanism 300 is moved two-dimensionally in the XY plane on the basis of a command signal of the computer and as shown in (S4) in FIG. 15, the unit is moved to immediately above the pallet P located at a predetermined position (here, the coordinate (X2, Y2), and actually, more specific coordinates are allocated according to the size of the article W (tire), and here, any one of (a1, a2, a3, a4) for loading four articles W (tire)) and lowered to transfer the article W onto the pallet P.

Figure 15:
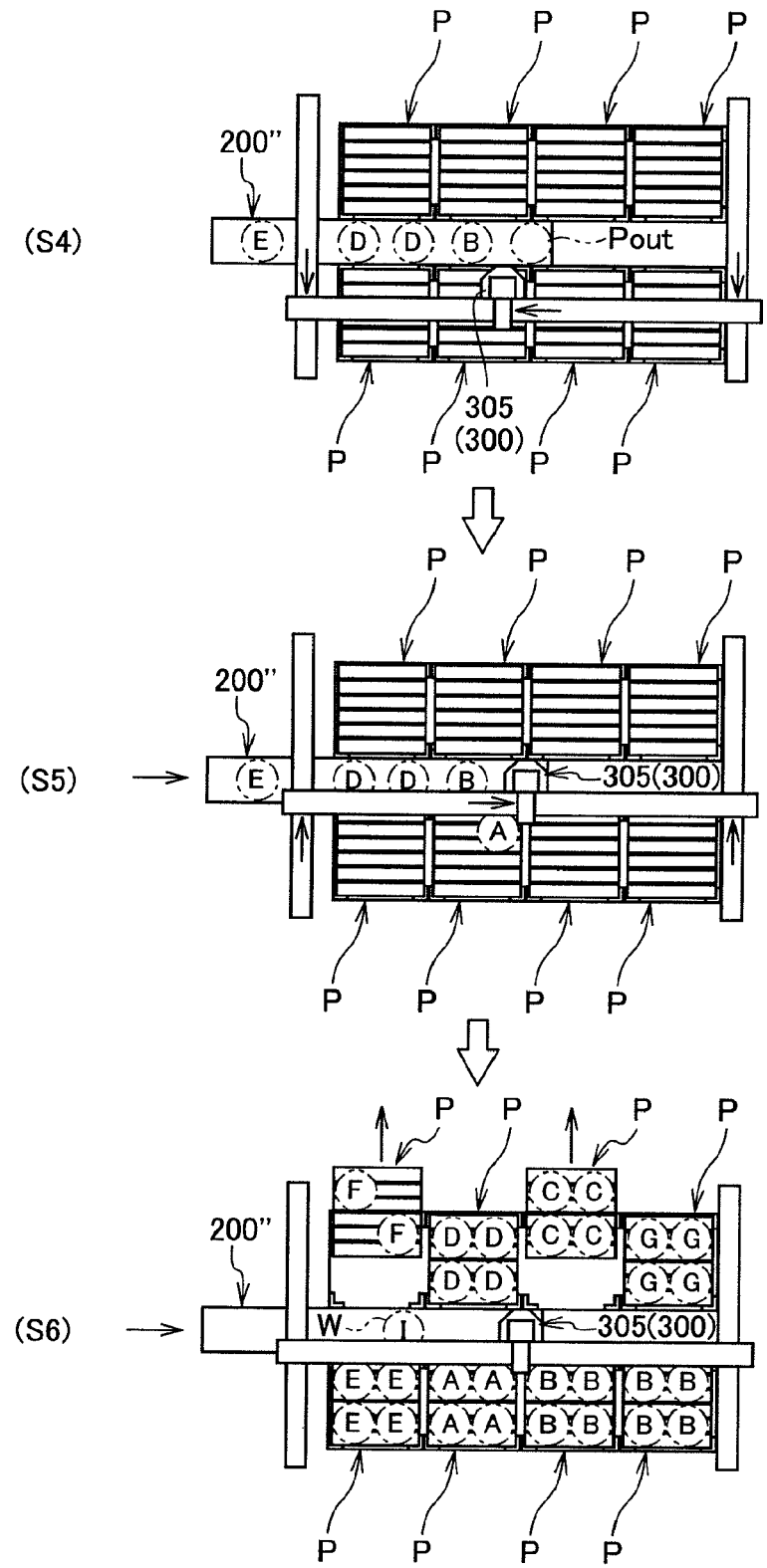
FIG. 15 is an operation diagram for explaining an operation of the storage system shown in FIGS. 11 to 13.

Here, as shown in (S5) in FIG. 15, the type of the article W stored on the pallet P at the coordinate (X2, Y2) is type A, and the articles W of type A are loaded on the remaining three loading spaces on this pallet P.

That is, the address-space setting step for setting the address spaces corresponding to the eight pallets P on the basis of the type of the article W which was transferred first is performed here.

By setting (allocating) the address space on the basis of the type of the article W which was loaded first as above, the flexible storage processing corresponding to the time-dependent request or the like each time can be performed.

The transfer mechanism 300 (holding unit 305) is set, similarly in the following as shown in (S6) in FIG. 15, so that the article W of type A is transferred onto the pallet P at the coordinate (X2, Y2) and the articles W of types F, D, C, G, E, B, B are transferred onto each of the pallets P at the coordinates (X1, Y1), (X2, Y1), (X3, Y1), (X4, Y1), (X1, Y2), (X3, Y2), (X4, Y2). That is, on the basis of the information obtained by the reading step of the article and the address-space setting step, the carrying-in/transfer step for transferring the article W onto the pallet P on the supporting table 100 by the transfer mechanism 300 is performed.

The two supporting tables 100 store 128 pieces (16×4×2) in total of the articles W on the eight pallets P respectively in a state in which the articles W are stacked in 2×2 in plural stages (four stages).

With regard to the pallet P onto which the article W has been transferred by the carrying-in/transfer step, the information relating to the address space is updated in the address-space setting step. In the recording card attached to the pallet P, too, new information is written in and updated by the reading/writing unit 500.

According to the above, since the article W is transferred and the information relating to the address space is updated at the same time, the articles W can be surely transferred onto the pallet P with a limited capacity without overload, and the loading information of the article W in the pallet P can be managed with high accuracy.

On the other hand, in the management processing, if there are both an urgent delivery request for the article W of type I having been not stored yet and a change request for a storage location of the article W of type F, for example, as shown in (S6) in FIG. 15, first, the pallet P filled with the articles W of type C and the pallet P loaded with the articles W of type F to the half are carried out by the outside forklift FL, and the pallet P filled with the articles W of type C is fed to the subsequent process such as a manufacturing line, while the pallet P loaded with the articles W of type F is temporarily made to stand by in a predetermined standby area (not shown).

Figure 16:
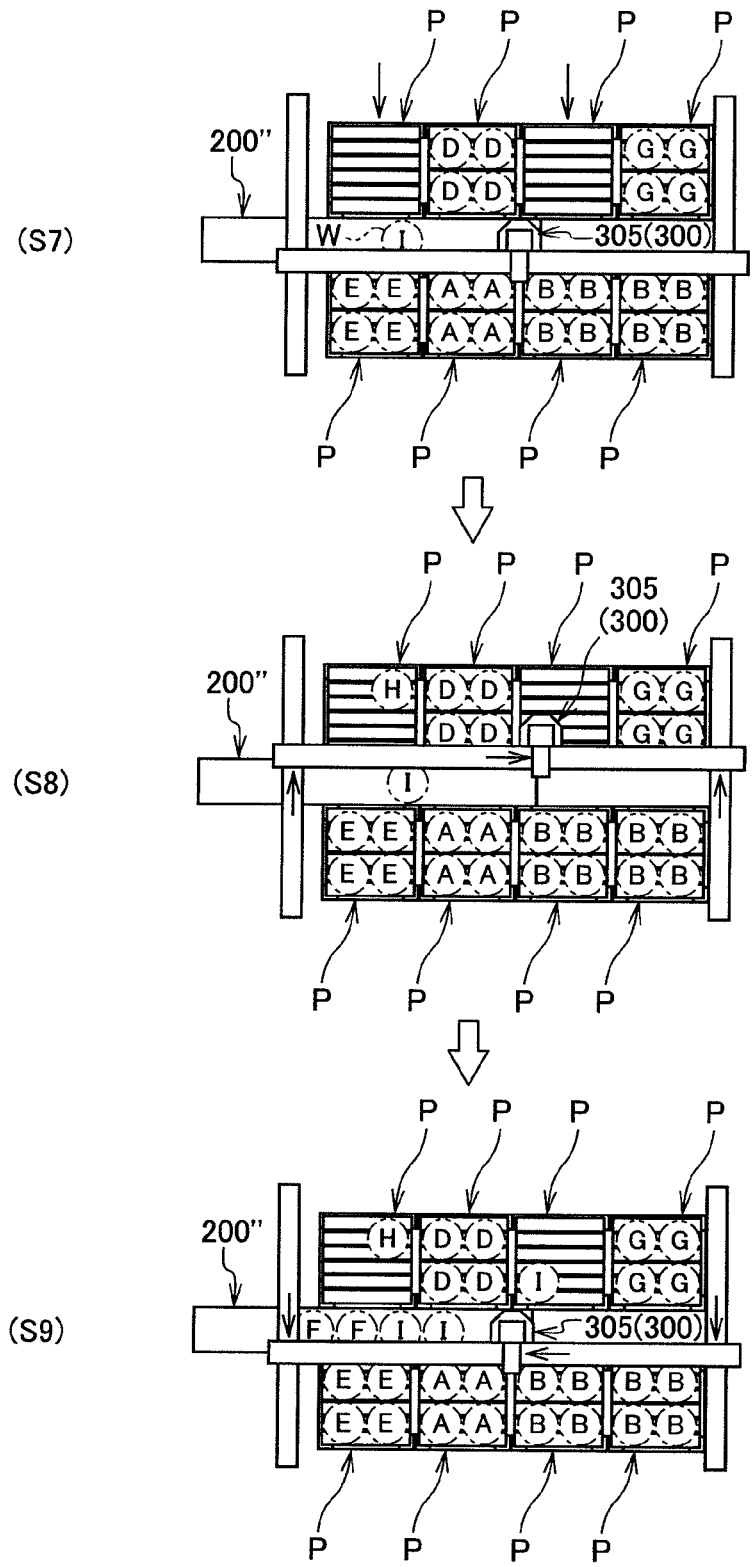
FIG. 16 is an operation diagram for explaining an operation of the storage system shown in FIGS. 11 to 13.

Then, by the forklift FL, as shown in (S7) in FIG. 16, two empty pallets P are carried into the two emptied supporting portions 101, respectively.

Then, as mentioned above, the reading/writing unit 500 reads the recording cards on the two pallets P newly supported at the two supporting portions 101 (supporting positions) on the supporting table 100 (storage area), and on the basis of the read-out information, the address-space setting step for setting the address space corresponding to the two pallets P is performed by the computer.

Subsequently, when the articles W of type I are carried in by the carrying-in line 200" in a state mixed with the articles W of type H, as shown in (S8, S9) in FIG. 16, the transfer mechanism 300 is operated similarly as the above so as to transfer the articles W of type H onto the one pallet P and to transfer the articles W of type I onto the other pallet P.

Figure 17:
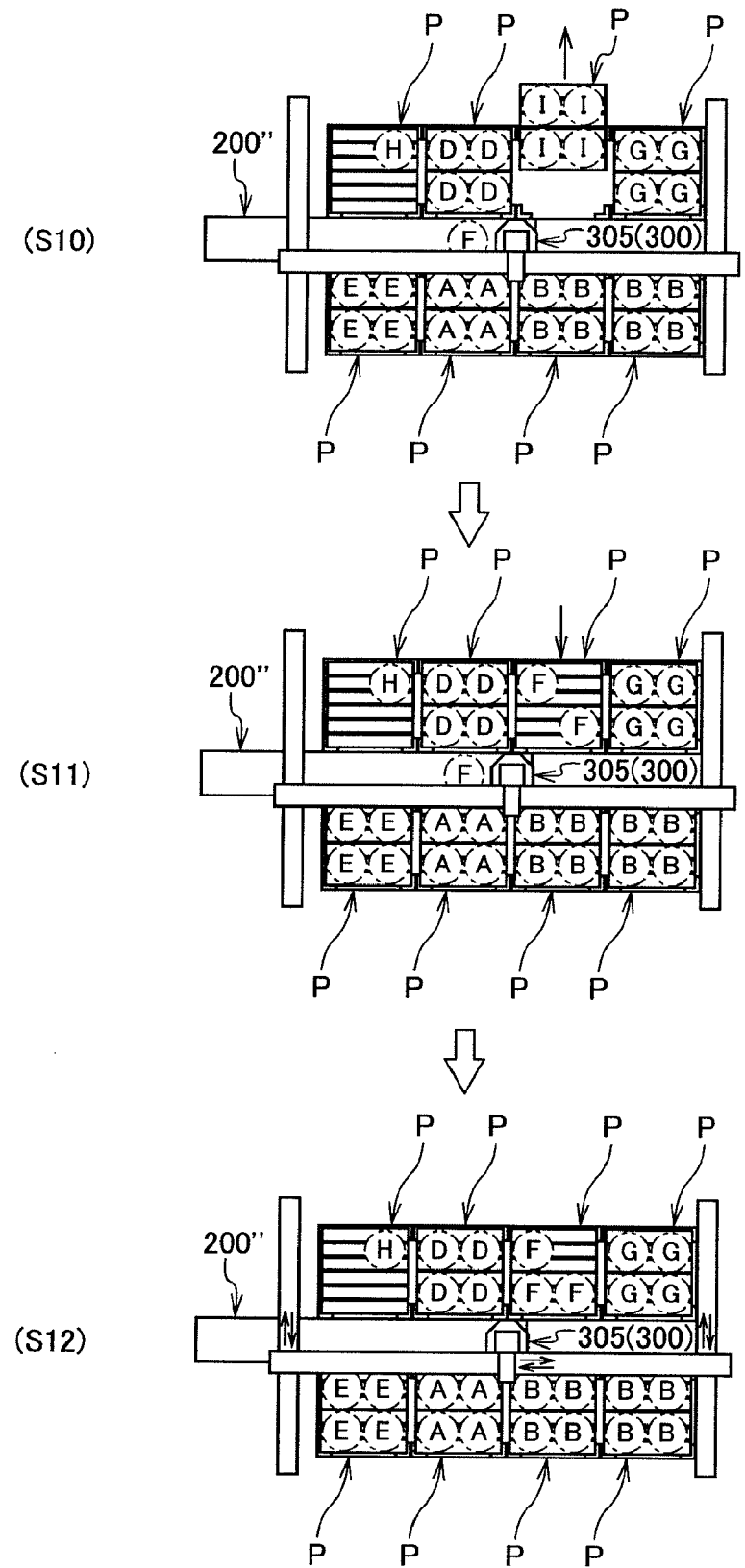
FIG. 17 is an operation diagram for explaining an operation of the storage system shown in FIGS. 11 to 13.

When the transfer of the articles W of type I to the pallet P, which is urgent, has been completed, as shown in (S10) in FIG. 17, the pallet P is carried out by the outside forklift FL or the like and transported to a requested location (the subsequent process of the manufacturing line, for example).

When this urgent carrying-out processing is completed, as shown in (S11) in FIG. 17, the pallet P having been in standby in the standby area is carried in by the forklift FL to the supporting portion 101 corresponding to the coordinate (X3, Y1) and supported, the reading/writing unit 500 reads the recording card provided on the pallet P, and the address-space setting step for setting the address space corresponding to this pallet P is executed by a computer.

After that, according to the procedure as above, as shown in (S12) in FIG. 17, the articles W of type F are continuously transferred and stored on the pallet P located at the coordinate (X3, Y1), while the articles W of type H are continuously transferred and stored on the pallet P located at the coordinate (X1, Y1).

According to the above storage system, similarly to the above, since the pair of supporting tables 100 for arranging and supporting the plurality of pallets P on which the articles W can be loaded are employed as a storage area, the transfer mechanism 300 transfers the articles W onto the pallet P supported on the pair of supporting tables 100, and the articles W are stored on the pallet P in the stacked state, when the article W is to be taken out according to a delivery request, by taking it out for each pallet P by use of the carrying-out means such as the outside forklift FL or an automatic carrying-out line and the like, it becomes no longer necessary to perform the operation to transfer the article which is stored directly on the floor face as before to a pallet, the carrying-out processing is simplified, and the efficiency of the storage processing of the articles W as a whole (carrying-in from the outside, transfer to the storage area, carrying-out to the outside) is improved.

Also, if the storage (allocation) location for the article W is to be changed on the basis of the management plan of the articles W, the storage (allocation) location can be easily changed by taking in/out each pallet P on which the articles W are loaded with respect to the supporting position on the pair of supporting tables 100.

Moreover, since the two supporting tables 100 arranged and provided on both sides in the horizontal direction putting the carrying-in line 200" between them are employed, and the carrying-in line 200" defines the taking-out position Pout where the transfer mechanism 300 takes out the article W at the substantially center position in the storage area, the articles W which have been carried in by the carrying-in line 200" can be sorted to the both sides for storage. Therefore, the storage capacity of the articles W as a whole can be increased, and since the transfer mechanism 300 takes out the article W at the substantially center position (taking-out position Pout) of the storage area and transfers it onto the respective storage location (pallet P), the transfer operation can be performed in a short moving distance symmetrically with respect to the substantially center position as the center toward the both sides, and thus, the transfer time can be reduced, and the transfer efficiency can be further improved.

Figure 18:
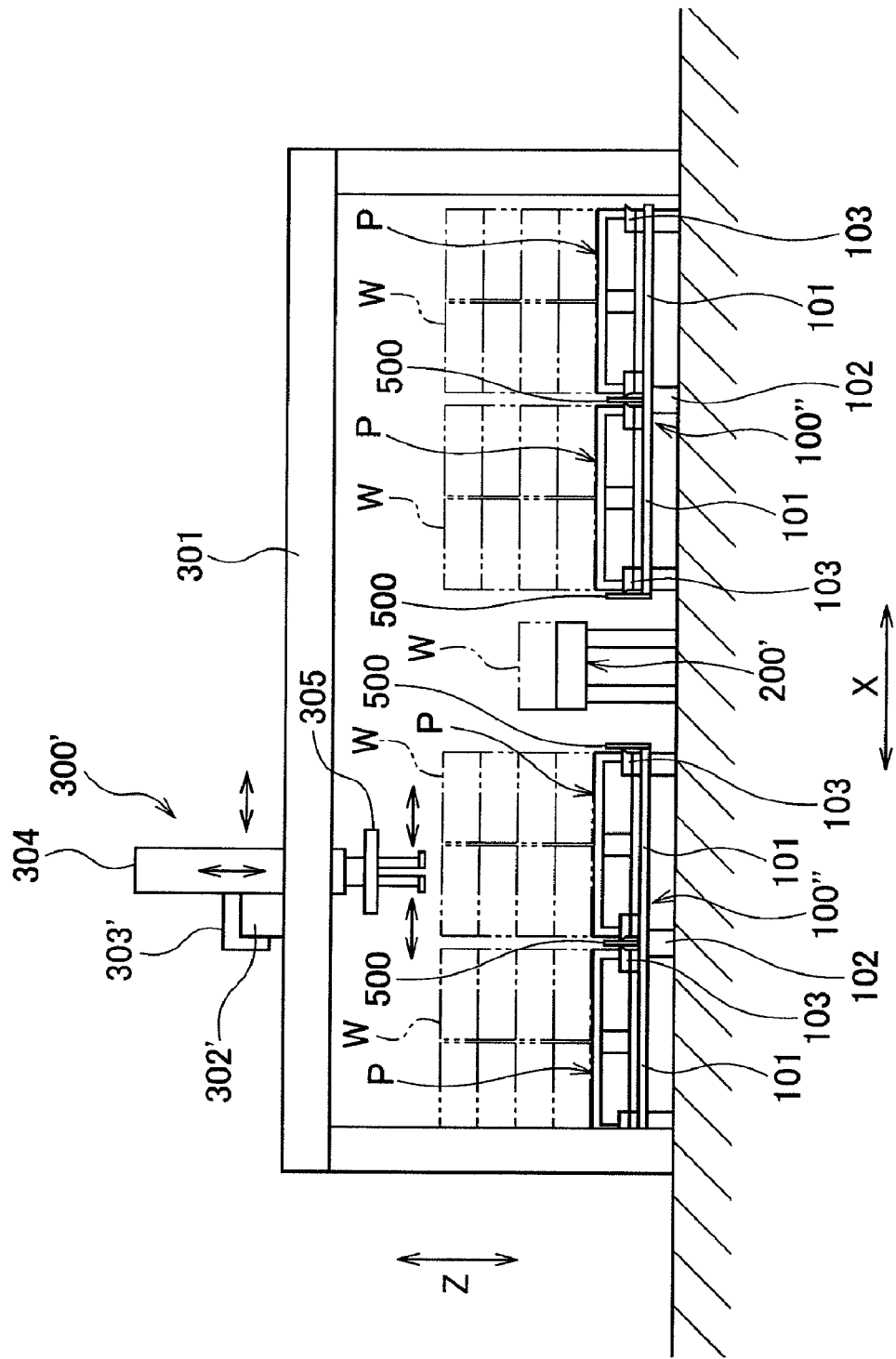
FIG. 18 is a front view illustrating still another embodiment of the storage system according to the present invention.
Figure 19:
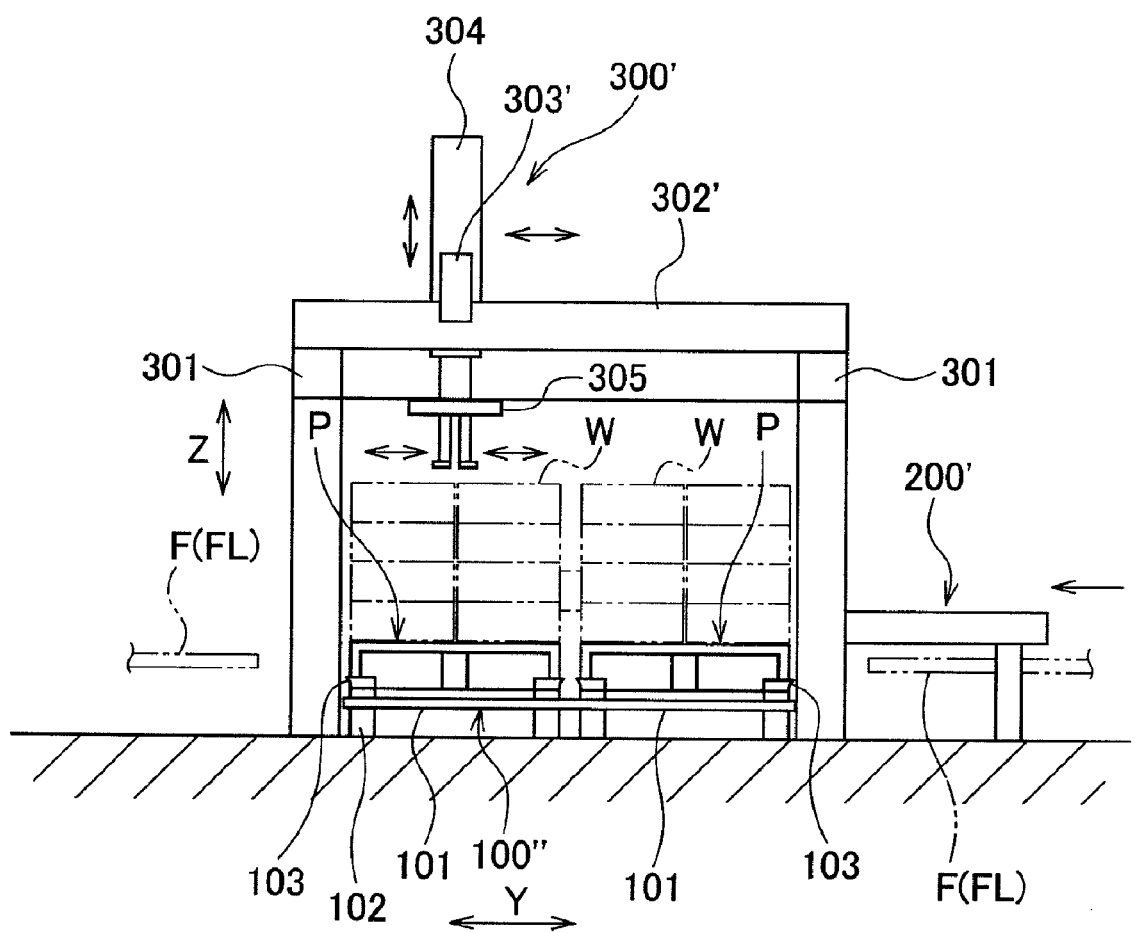
FIG. 19 is a side view of the storage system shown in FIG. 18.
Figure 20:
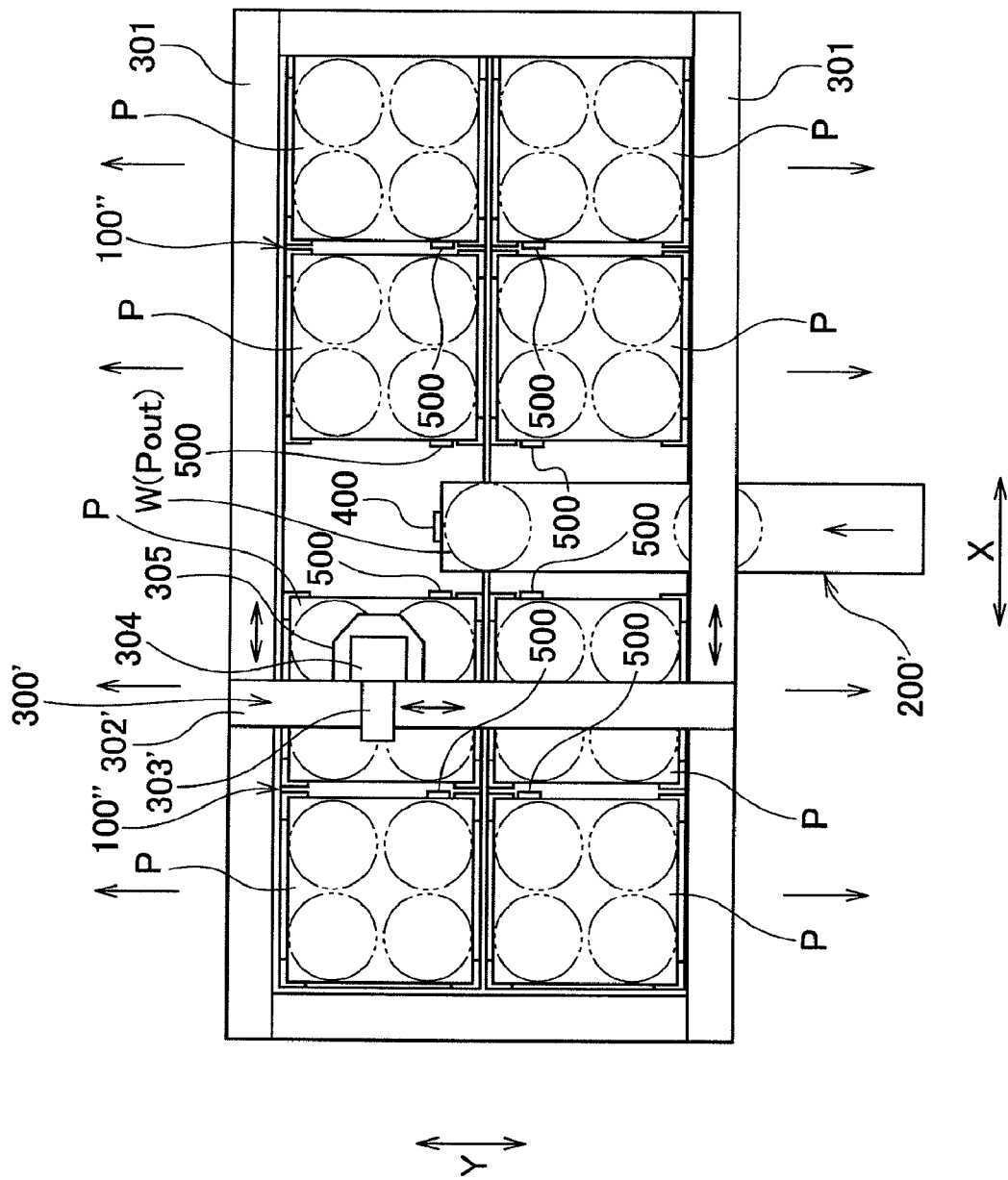
FIG. 20 is a plan view of the storage system shown in FIG. 18.

FIGS. 18 to 20 show still another embodiment of the storage system according to the present invention, and the same reference numerals are given to the same configuration as that in the above embodiment, and the description will be omitted.

That is, this storage system is provided with, as shown in FIGS. 18 to 20, a pair of separated supporting tables 100" as a storage area, the carrying-in line 200' arranged between the pair of supporting tables 100", the transfer mechanism 300' arranged in an upper region (ceiling region) of the pair of supporting tables 100" and the like.

The pair of supporting tables 100" are, as shown in FIGS. 18 to 20, provided with four supporting portions 101, respectively. That is, it corresponds to a form in which the supporting table 100 in the above embodiment is arranged in two pieces and separated from the center in the X direction.

The carrying-in line 200' is, as shown in FIGS. 18 to 20, arranged in the substantially center region between the pair of supporting tables 100" in the X direction and is formed so that the feeding direction extends in the Y direction. That is, the pair of supporting tables 100" are arranged and provided on both sides of the horizontal direction (X direction) putting the carrying-in line 200' between them.

In the downstream end region in the feeding direction (Y direction) on the carrying-in line 200' (that is, at the substantially center position in the storage area), the taking-out position Pout where the article W is taken out by the transfer mechanism 300' is defined.

The transfer mechanism 300' is, as shown in FIGS. 18 to 20, provided with a movable frame 302' supported movably in the X direction with respect to the fixed frame 301 extending in the X direction, a slider 303' supported movably in the Y direction with respect to the movable frame 302', the elevating arm 304, the holding unit 305 and the like.

According to this storage system, since the supporting tables 100" are arranged on the both sides so as to put the carrying-in line 200' between them, the articles W having been carried in by the carrying-in line 200' can be sorted to the both sides for storage, and the transfer mechanism 300' takes out the article W at the substantially center position of the storage area and transfers it to the respective pallets P arranged on the both sides, the transfer operation can be performed in a short moving distance symmetrically with respect to the substantially center position as the center, and thus, the transfer time can be reduced, and the transfer efficiency can be further improved.

Since the operation in this storage system is substantially identical with the above-mentioned embodiment except that the articles W which was taken out by the transfer mechanism 300' are sorted to the both sides of the carrying-in line 200' and transferred, the description here will be omitted.

FIGS. 21 to 24 show still another embodiment of the storage system according to the present invention, and the same reference numerals are given to the same configuration as that in the above embodiment, and the description will be omitted.

Figure 21:
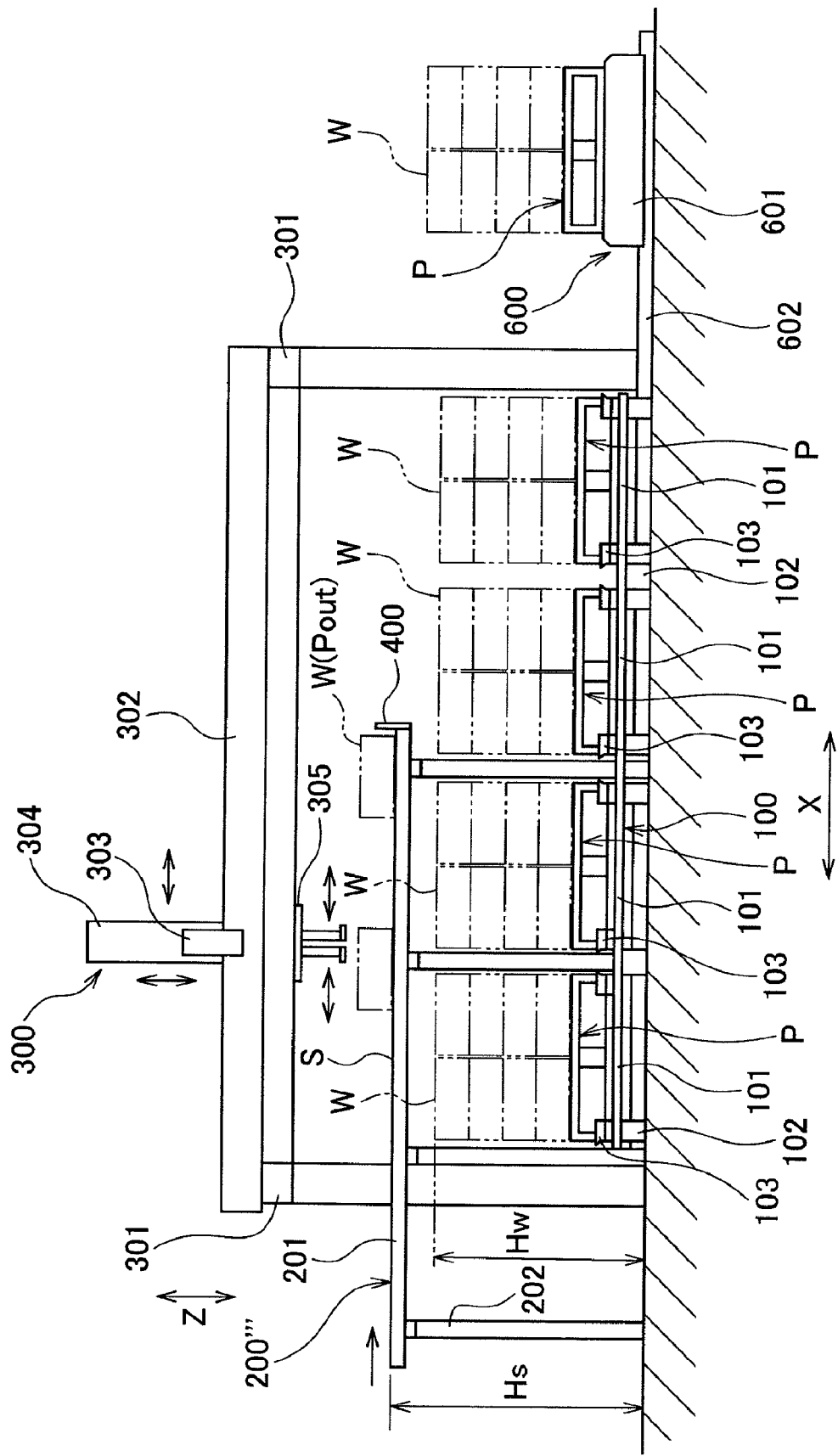
FIG. 21 is a front view illustrating still another embodiment of the storage system according to the present invention.
Figure 22:
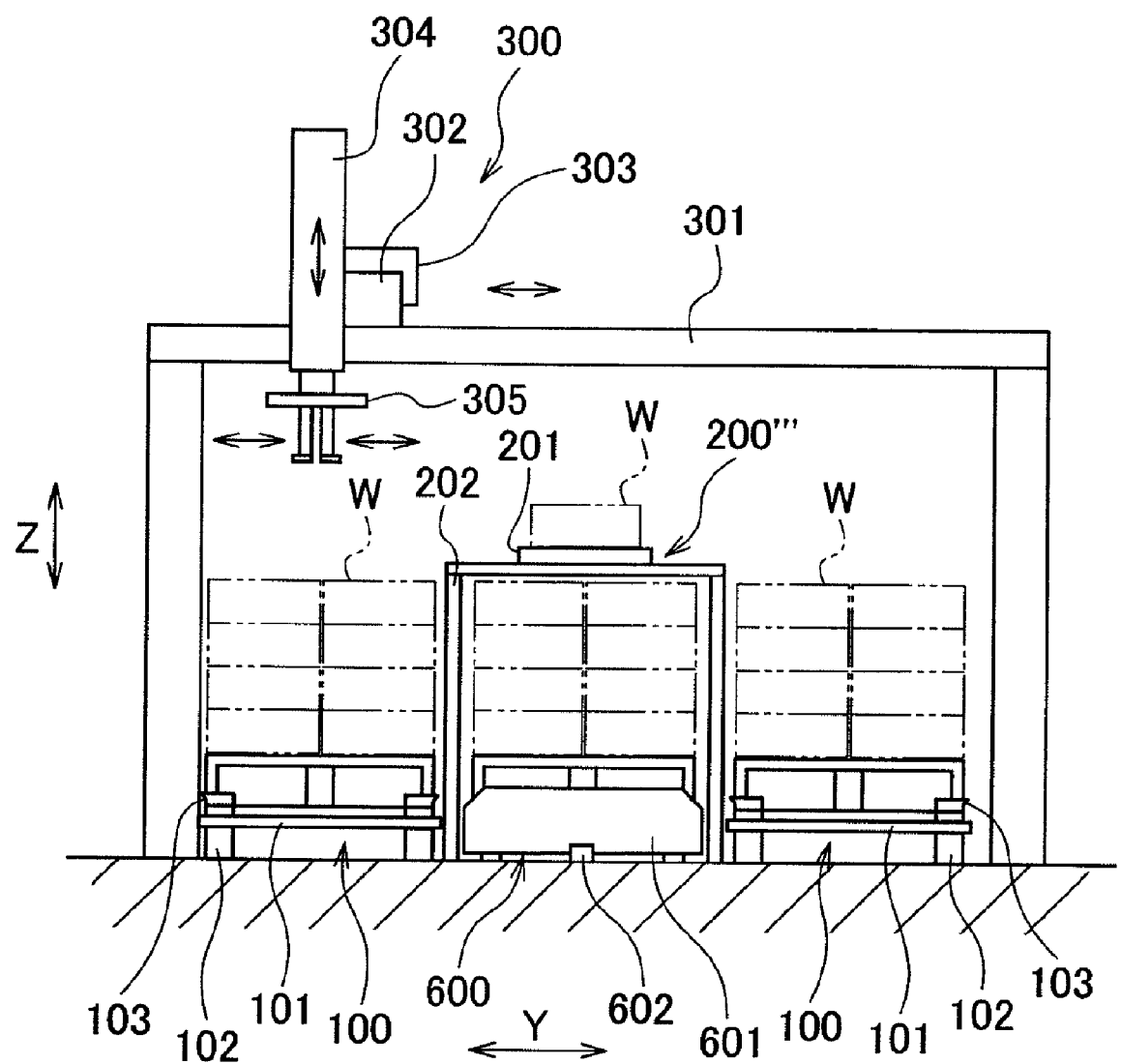
FIG. 22 is a side view of the storage system shown in FIG. 21.
Figure 23:
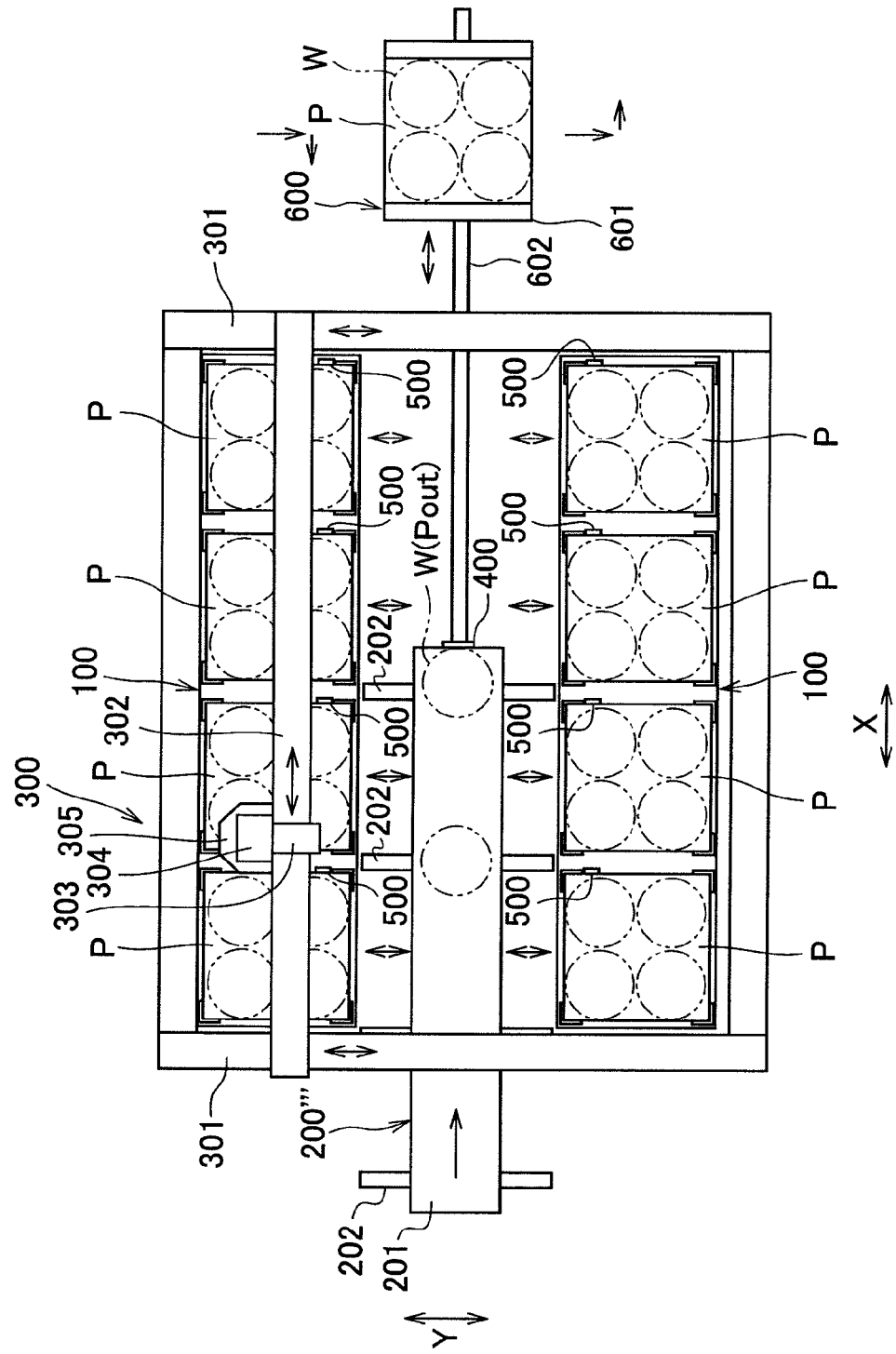
FIG. 23 is a plan view of the storage system shown in FIG. 21.

That is, this storage system is, as shown in FIGS. 21 to 23, provided with the two supporting tables 100 extending in the X direction, a carrying-in line 200''' arranged so as to be put between the two supporting tables 100, the transfer mechanism 300 arranged in an upper region (ceiling region) of the two supporting tables 100 (storage areas), a pallet conveying line 600 arranged between the two supporting tables 100 and the like.

The two supporting tables 100 have, as shown in FIGS. 21 to 23, four supporting portions 101 arranged in the X direction, respectively, and the four supporting portions 101 on one side and the four supporting portions 101 on the other side are arranged with a predetermined interval in the Y direction.

The carrying-in line 200''' is, as shown in FIGS. 21 to 23, provided with a feeding portion 201 having a feeding face S defined by a belt conveyer or a roller conveyer and the like, a gate-like leg portion 202 supporting the feeding portion 201 and the like, and it is arranged in the substantially center region between the pair of supporting tables 100 in the Y direction and formed so that the feeding direction extends in the X direction and a height $H_s$ of the feeding face S is defined at a position higher than the maximum height Hw of the articles W which are stacked in stages.

That is, the pair of supporting tables 100 are arranged and provided on both sides in the horizontal direction (Y direction) putting the carrying-in line 200''' between them, and in a downstream end region in the feeding direction (X direction) on the carrying-in line 200''' (that is, at the substantially center position in the storage area), the taking-out position Pout where the article W is taken out by the transfer mechanism 300 is defined.

The pallet feeding line 600 is, as shown in FIGS. 21 to 23, provided with a movable unit 601 movably supported in the X direction between the two supporting tables 100, a guide rail 602 for guiding the movable unit 601 in the X direction and the like.

Here, the movable unit 601 is provided with a driving unit applying a driving force to the pallet P (a conveyer supporting a lower face of the pallet P and an arm to be hooked on to a part of the pallet P so as to take them in, for example (either of them is not shown)) so as to feed out the supported pallet P to the supporting portion 101 and to take in the pallet P from the supporting portion 101.

Then, the movable unit 601 of the pallet conveying line 600 reciprocally moves in a predetermined range in the X direction including the lower part of the leg portion 202 of the carrying-in line 200''' so as to feed out the empty pallets P to the respective supporting portions 101 (supporting positions) of the supporting tables 100 on the both sides and to receive the pallets P loaded with the articles W from the respective supporting portions 101 (supporting positions) of the supporting tables 100 on the both sides.

According to this storage system, since the empty pallets P (or the pallet P partially loaded with the articles W) are automatically carried in by the pallet conveying line 600 (movable unit 601) to the respective supporting portions 101 (supporting positions) on the supporting table 100 (storage area) and the pallets P on which the requested articles W are loaded are automatically carried out toward the outside of the storage area from the respective supporting portions 101 (supporting positions) on the supporting table 100 (storage area), the taking in/out operation of the pallet P and the carrying-out operation of the articles W can be performed efficiently.

Particularly, since the movable unit 601 can reciprocally move in the X direction between the supporting tables 100 arranged on the both sides so as to deliver the pallet P with the supporting table 100 on one side or the supporting table 100 on the other side, the taking in/out operation and the carrying-out operation of the pallet P which is empty or on which the articles W are loaded can be performed further efficiently.

Also, since the feeding face S of the carrying-in line 200''' is arranged at a position higher than the maximum height Hw of the articles W which are stacked on the pallet P supported on the supporting table 100, when the transfer mechanism 300 transfers the article W on the carrying-in line 200''' onto the pallet P in the storage area, the mechanism slightly lifts up the article W from the feeding face S and holds it and then, only moves horizontally or downward and transfers it onto the pallet P, and since there is no need to lift up the article W high, the transfer operation can be simplified or a work amount (load) can be reduced by that amount, the efficiency of the storage processing can be improved as a whole, and the movable unit 601 of the pallet feeding line 600 can move through its lower region and the carry-in line 200''' and the pallet conveying line 600 can be arranged in a concentrated manner, by which the installation space can be saved.

Since the operations in the storage system are substantially the same as those in the above-mentioned embodiment except that the carrying-in and carrying-out of the pallet P are performed by the pallet conveying line 600, the description here will be omitted.

Figure 24:
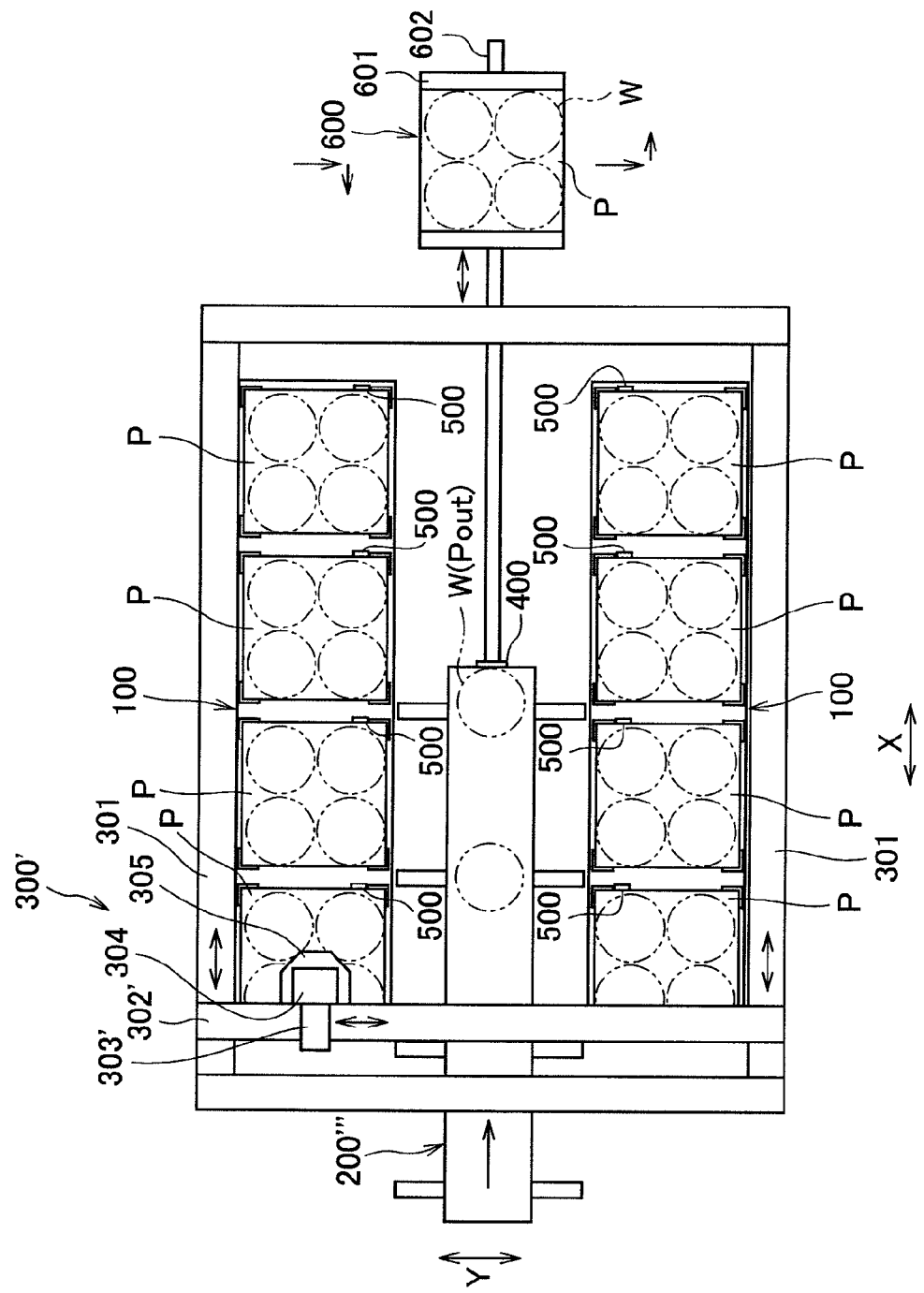
FIG. 24 is a plan view in which a part of the storage system shown in FIGS. 21 to 23 is changed.

Instead of the transfer mechanism 300 shown in FIGS. 21 to 23, the transfer mechanism 300' shown in FIG. 24 may be employed. In this case, the length of the movable frame 302' can be shortened, and a weight of the movable body can be reduced.

Also, the pallet conveying line 600 may perform either one of the carrying-in operation of the pallet P or the carrying-out operation of the pallet P in a collaborated work with the forklift FL. In this case, the forklift FL performs an operation assisting the operation of the pallet conveying line 600. For example, if the pallet conveying line 600 performs the carrying-in operation of the pallet P, the forklift FL performs the carrying-out operation of the pallet P. As a result, the efficiency of the storage processing can be further improved.

Figure 25:
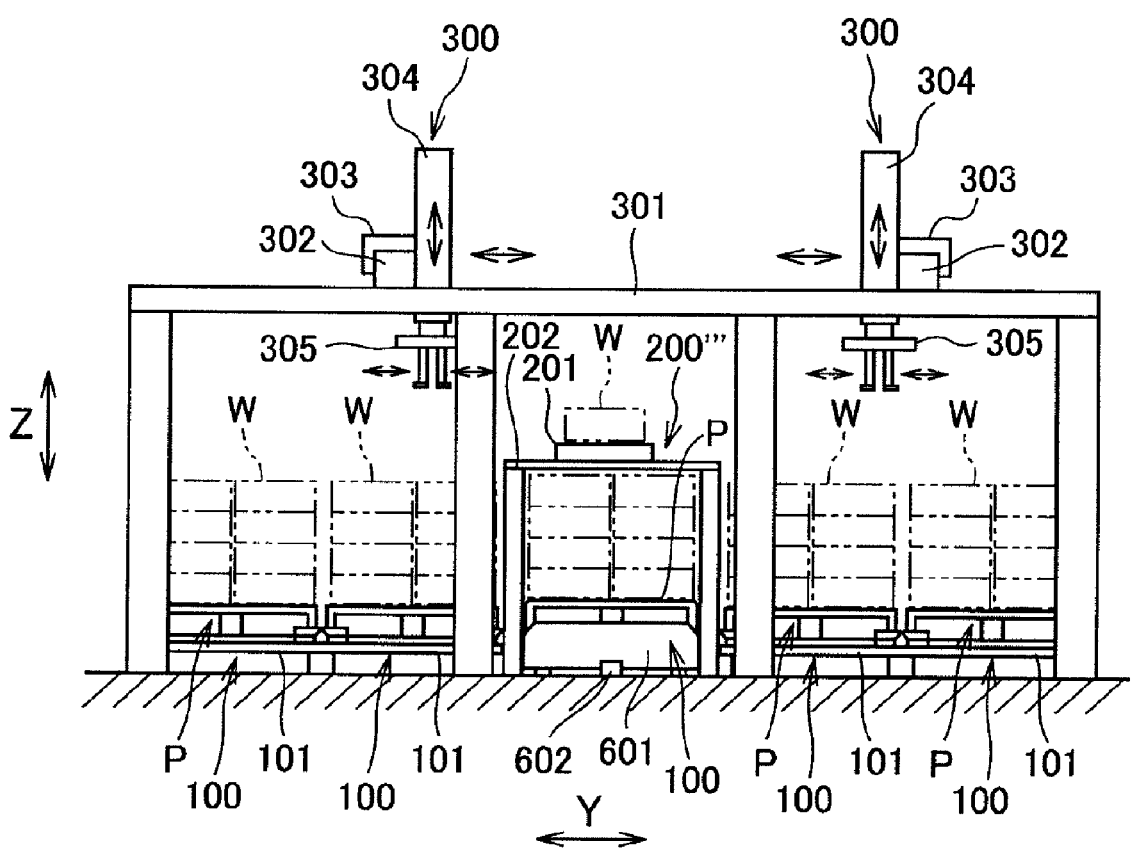
FIG. 25 is a side view illustrating still another embodiment of the storage system according to the present invention.
Figure 26:
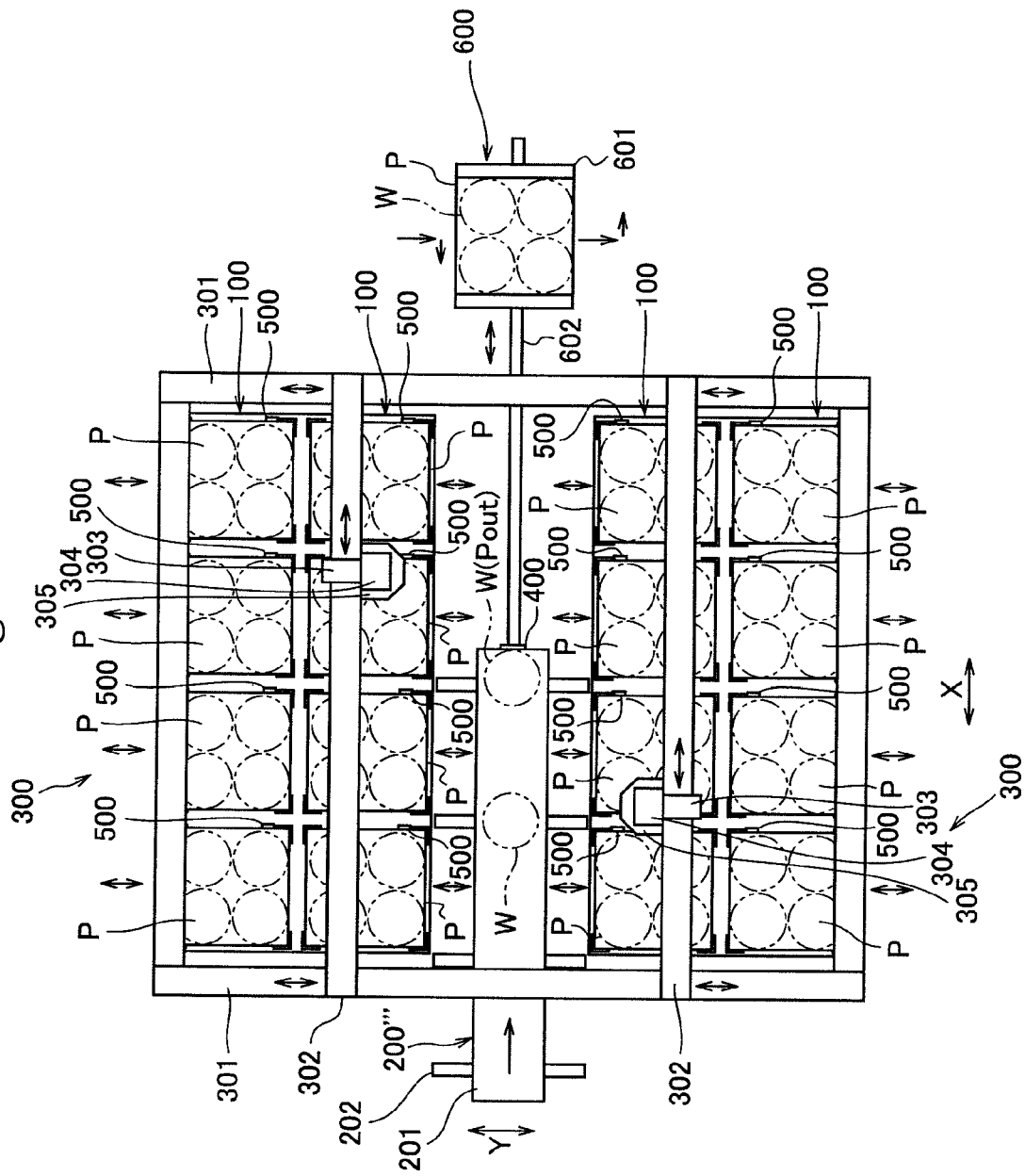
FIG. 26 is a plan view of the storage system shown in FIG. 25.

FIGS. 25 and 26 show still another embodiment of the storage system according to the present invention and the same as the embodiment shown in FIGS. 21 to 23 except that the four supporting tables 100 and the two transfer mechanisms 300 are employed.

That is, this storage system is provided with the four supporting tables 100 extending in the X direction, the carrying-in line 200''' arranged so as to be put between the internal two supporting tables 100 of the four supporting tables 100, two transfer mechanisms 300 arranged on the upper region (ceiling region) of the four supporting tables 100 (storage area), the pallet conveying line 600 arranged between the internal two supporting tables 100 in the four supporting tables 100 and the like.

According to this storage system, as compared with the embodiment shown in the above-mentioned FIGS. 21 to 23, the storage capacity of the article W can be increased by a portion corresponding to the added two supporting tables 100 (eight pallets P supported by the eight supporting portions 101).

Since the operation in this storage system is substantially the same as the embodiment shown in the above-mentioned FIGS. 21 to 23 except that the carrying-in and carrying-out of the pallet P supported on the supporting tables 100 arranged on both outsides are performed by outside forklift or the like, the description here will be omitted.

FIGS. 27 to 29, 30A and 30B show still another embodiment of the storage system according to the present invention, and the same reference numerals are given to the same configuration as that in the above-mentioned embodiment, and the description will be omitted.

Figure 27:
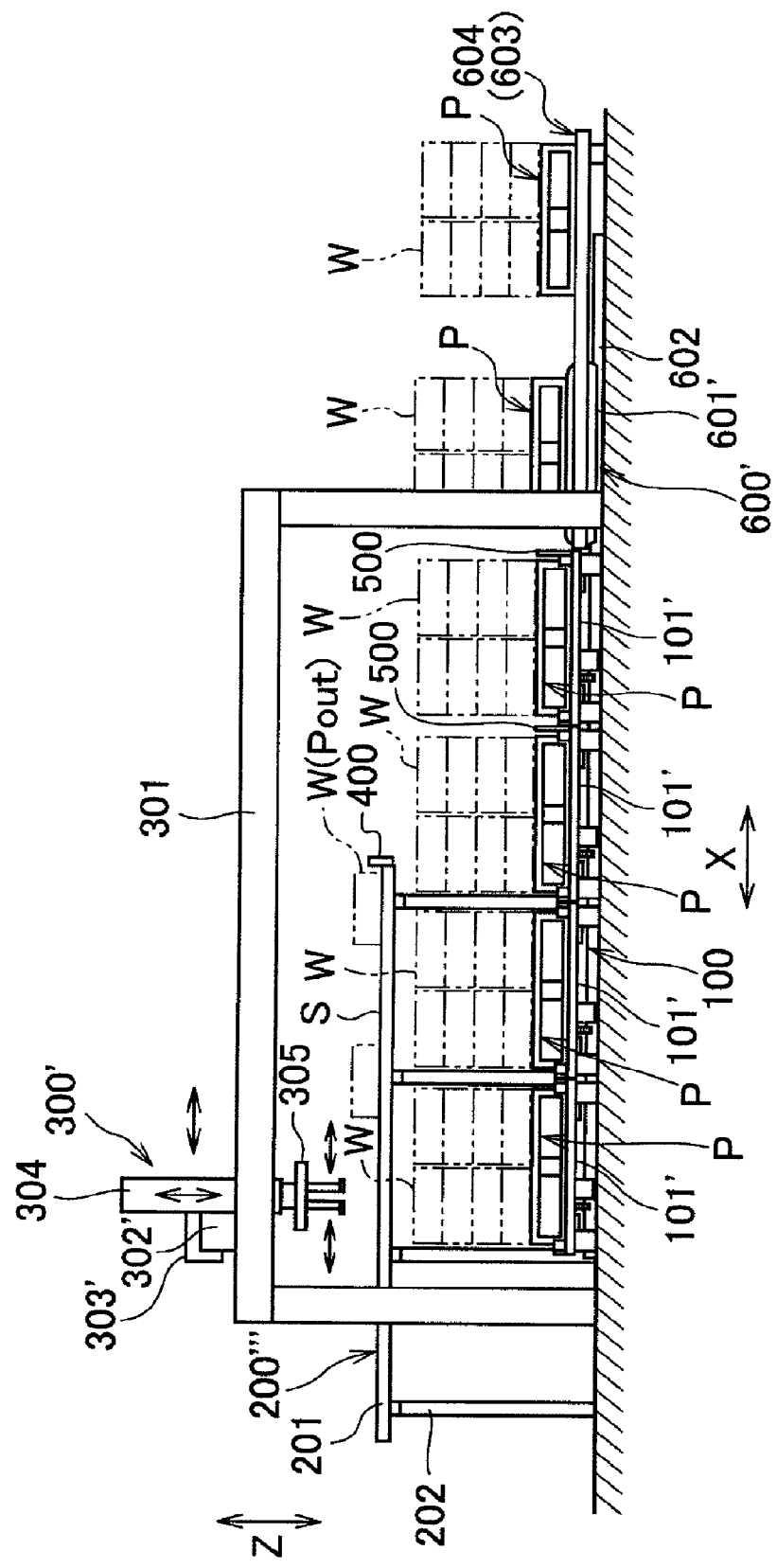
FIG. 27 is a front view illustrating still another embodiment of the storage system according to the present invention.
Figure 28:
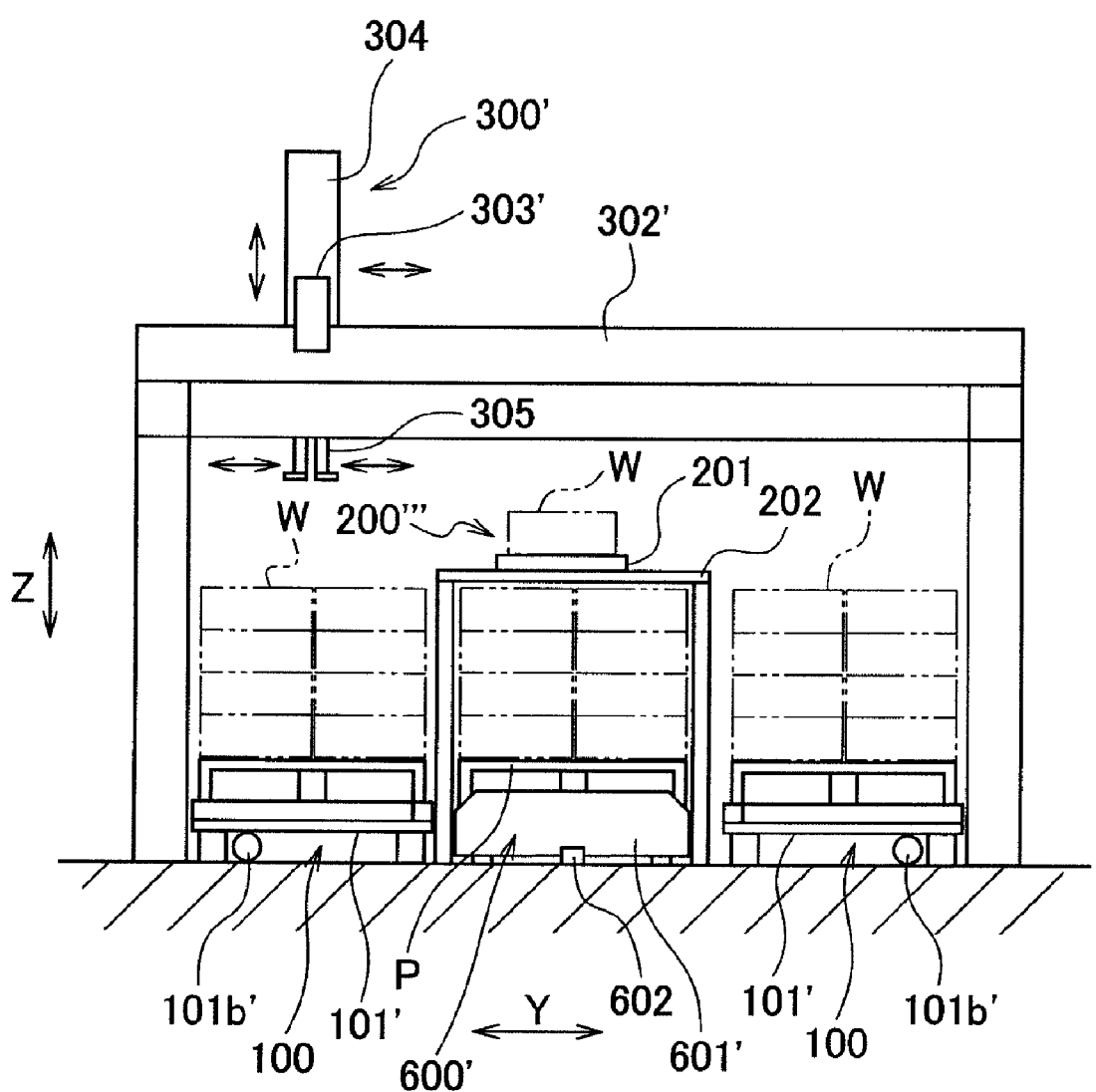
FIG. 28 is a side view of the storage system shown in FIG. 27.
Figure 29:
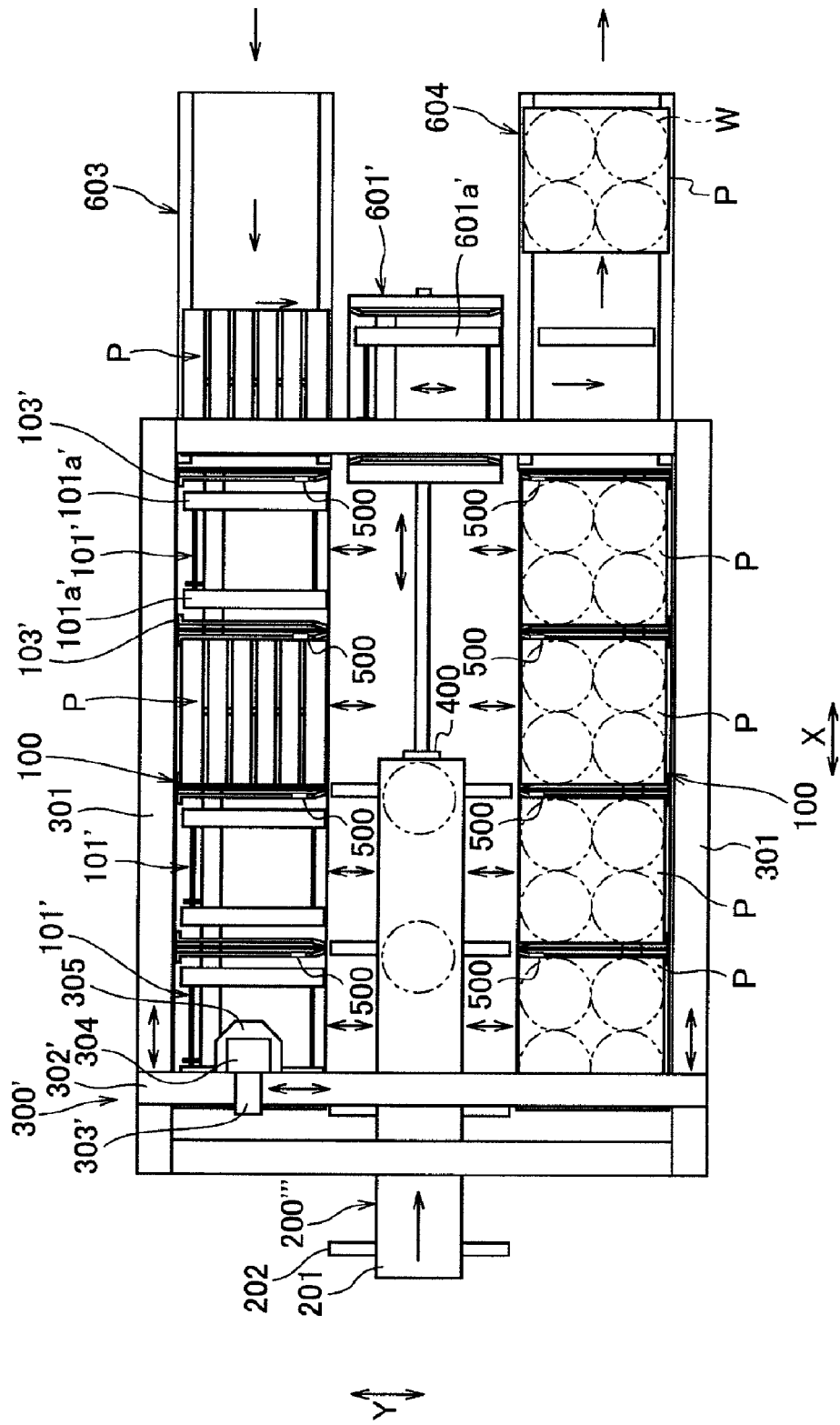
FIG. 29 is a plan view of the storage system shown in FIG. 27.
Figure 30A:
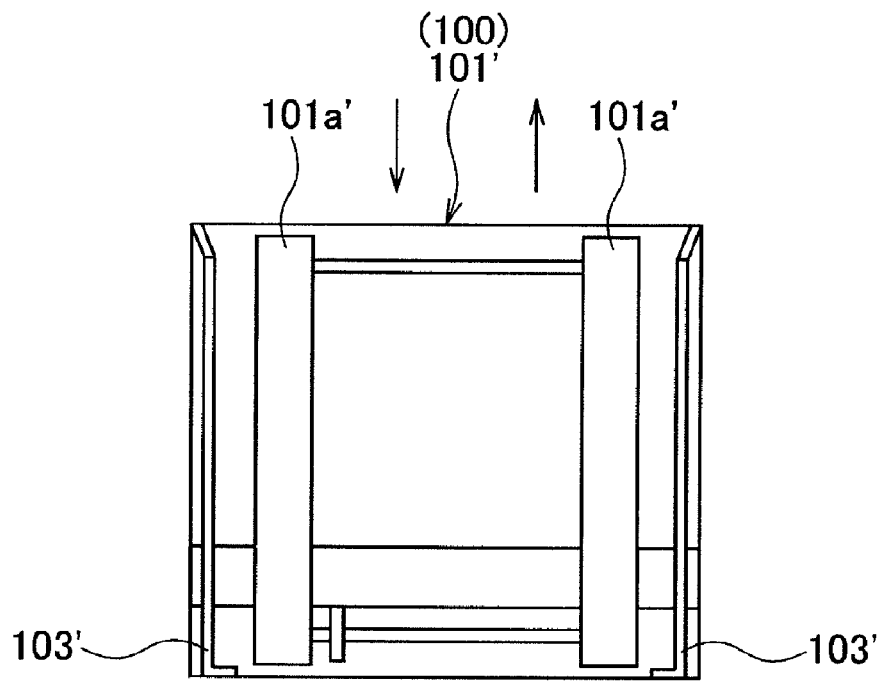
FIG. 30A is a plan view illustrating a supporting table constituting a part of the storage system shown in FIG. 27.
Figure 30B:
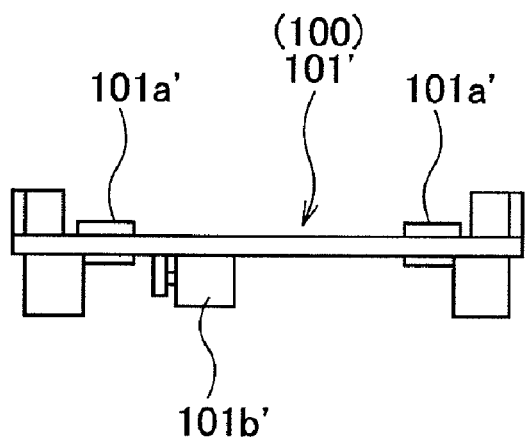
FIG. 30B is a front view of the supporting table shown in FIG. 30A.

That is, this storage system is, as shown in FIGS. 27 to 29, the two supporting tables 100 extending in the X direction, the carrying-in line 200''' arranged so as to be put between the two supporting tables 100, the transfer mechanism 300' arranged on the upper region (ceiling region) of the two supporting tables 100 (storage areas), a pallet conveying line 600' and the like.

The two supporting tables 100 have, as shown in FIGS. 27 to 30B, four supporting portions 101' arranged in the X direction, respectively, and two positioning portions 103' provided at each of the supporting portions 101', and the four supporting portions 101' on one side and the four supporting portions 101' on the other side are arranged with a predetermined interval in the Y direction.

The supporting portion 101' is, as shown in FIGS. 27 to 30B, formed to be provided with a belt-conveyer type driving unit including a pair of supporting belts 101a' and a driving motor 101b' so as to support the pallet P and to give a driving force to the pallet P during carrying-in and carrying-out.

The two positioning portions 103' is formed so as to receive the pallet P carried-in in the horizontal direction, to stop the pallet at a predetermined supporting position and to position the pallet.

The pallet feeding line 600' is, as shown in FIGS. 27 to 29, provided with a movable unit 601' movably supported in the X direction between the two supporting tables 100, the guide rail 602 for guiding the movable unit 601' in the X direction, a pallet carrying-in unit 603 arranged adjacent to the supporting table 100 on one side, a pallet carrying-out unit 604 as a carrying-out means arranged adjacent to the supporting table 100 on the other side and the like.

The movable unit 601' is formed to be provided with a belt-conveyer type driving unit including a pair of supporting belts 601a' and a driving motor (not shown) so as to support the pallet P and to give the driving force to the pallet P when feeding out the pallet P to the supporting portion 101' or when taking in the pallet P from the supporting portion 101'.

The movable unit 601' is configured to reciprocally move in a predetermined rage in the X direction including the lower part of the leg portion 202 of the carrying-in line 200''' so as to feed out the empty pallet P toward each of the supporting portions 101' (supporting positions) of the supporting tables 100 on the both sides or to receive the pallet P loaded with the article W from each of the supporting portions 101' (supporting positions) of the supporting tables 100 on the both sides.

The pallet carrying-in unit 603 is, as shown in FIG. 29, formed so as to include a conveyer for supporting the pallet P and moving it in the X direction, a conveyer for feeding out the pallet P having been carried in to a predetermined position in the Y direction and the like so that the empty pallet P is carried in to the predetermined position and delivered to the movable unit 601'.

The pallet carrying-out unit 604 is, as shown in FIG. 29, formed so as to include a conveyer for supporting the pallet P and moving it in the X direction, a conveyer for receiving the pallet P in the Y direction at a predetermined position and the like so that the pallet P loaded with the articles W is received at the predetermined position from the movable unit 601' and carried out in the X direction toward the outside.

Subsequently, the operation of the storage system will be described referring to FIGS. 31 to 34.

Here, with regard to the information relating to the supporting position (each supporting portion 101') on the supporting table 100, coordinates (X1, Y1), (X2, Y1), (X3, Y1), (X4, Y1), (X1, Y2), (X2, Y2), (X3, Y2), (X4, Y2) are inputted in the computer in advance.

Figure 31:
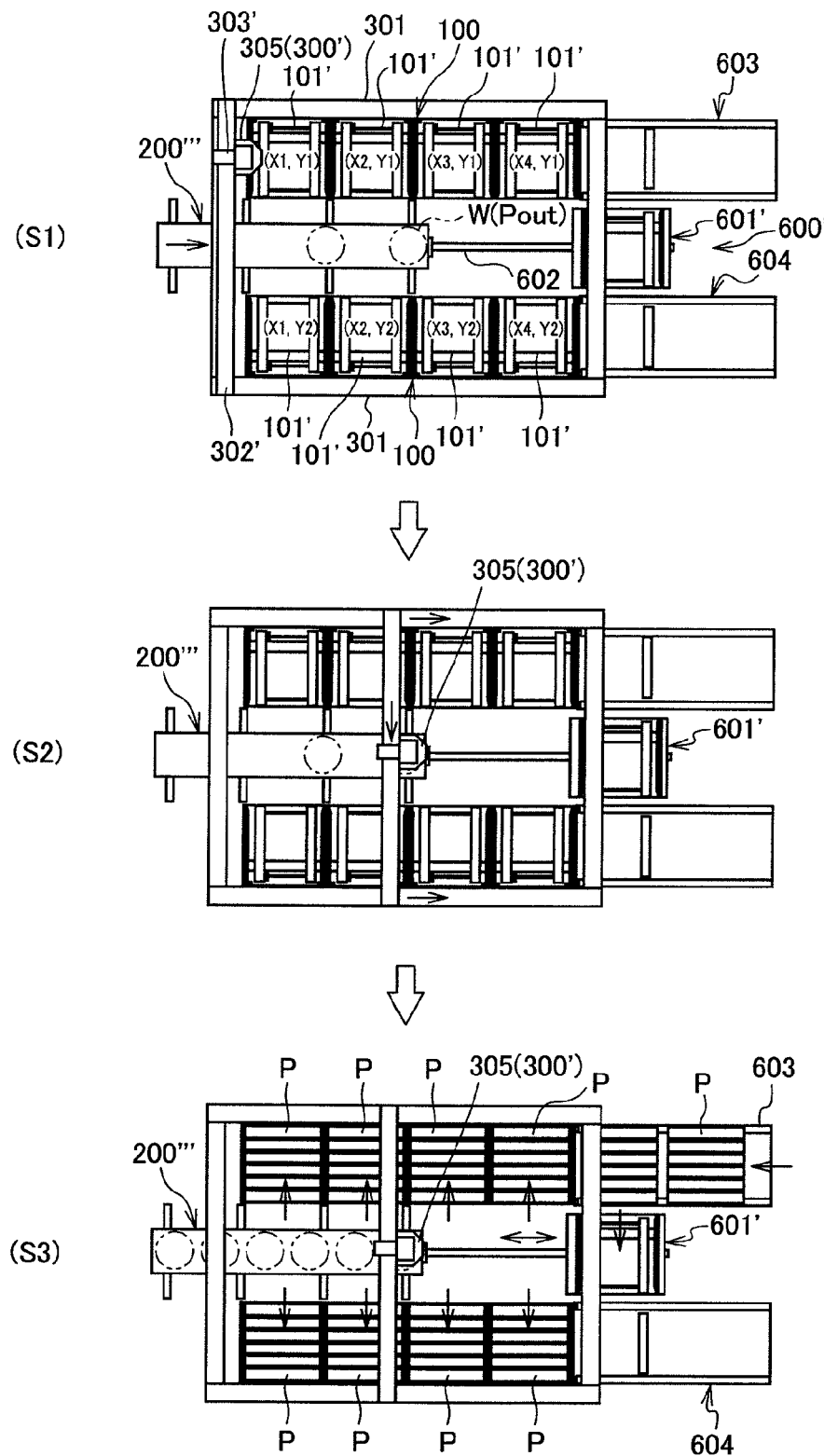
FIG. 31 is an operation diagram for explaining an operation of the storage system shown in FIGS. 27 to 29.

First, as shown in (S1) in FIG. 31, the article W is carried into the taking-out position Pout located at the substantially center of the storage area by the carrying-in line 200'''. Then, the reading sensor 400 reads the read label affixed to the article W. That is, the reading step of an article for reading the information relating to the article W carried in by the carrying-in line 200''' is performed by the reading sensor 400.

The reading step of an article is performed at the taking-out position Pout on the carrying-in line 200''' as above. That is, since the information relating to the article W is read immediately before transfer to the storage area (pallet P on the supporting table 100), the article W can be transferred to and stored in the corresponding storage area assuredly and with high accuracy on the basis of the information.

Subsequently, the holding unit 305 of the transfer mechanism 300' is, as shown in (S2) in FIG. 31, moved from the standby position and positioned above the taking-out position Pout.

Subsequently, by means of the pallet carrying-in unit 603 and the movable unit 601' of the pallet conveying line 600', as shown in (S3) in FIG. 31, the eight empty pallets P are carried into the eight supporting portions 101' in total on the supporting tables 100 on both sides. That is, the carrying-in step of the empty pallets P by the pallet conveying line 600' is performed.

During this carrying-in, since the driving unit (the pair of supporting belts 601a' and the driving motor (not shown)) of the movable unit 601' gives the driving force for feeding out the pallet P, and the driving unit of the supporting portion 101' (the pair of supporting belts 101a' and the driving motor 101b') gives the driving force to receive the pallet P, the smooth transfer operation of the pallet P is performed, and the pallet P carried onto the supporting portion 101' is guided by the positioning portions 103' and smoothly positioned and supported on the supporting portion 101'.

Subsequently, the reading/writing unit 500 reads the recording cards provided on the eight pallets P supported by the eight supporting portions 101' (supporting positions) on the supporting table 100 (storage area) and on the basis of the read-out information, the address-space setting step for setting the address space corresponding to the eight pallets P is performed by the computer.

Here, the information that no article W is loaded on the eight pallets P and the pallet is empty is written in the recording card in advance.

The carrying-in operation of the pallet P may be performed prior to the carrying-in of the articles W.

Subsequently, the holding unit 305 of the transfer mechanism 300' is slightly lowered to hold the article W and lightly lifts it up from the carrying-in line 200'''. Then, the holding unit 305 of the transfer mechanism 300' moves two-dimensionally in the XY plane on the basis of a command signal of the computer, and as shown in (S4) in FIG. 32, the unit is moved to immediately above the pallet P located at a predetermined position (here, the coordinate (X2, Y2), and actually, more specific coordinates are allocated according to the size of the article W (tire), and here, any one of (a1, a2, a3, a4) for loading four articles W (tire)) and lowered to transfer the article W onto the pallet P.

Figure 32:
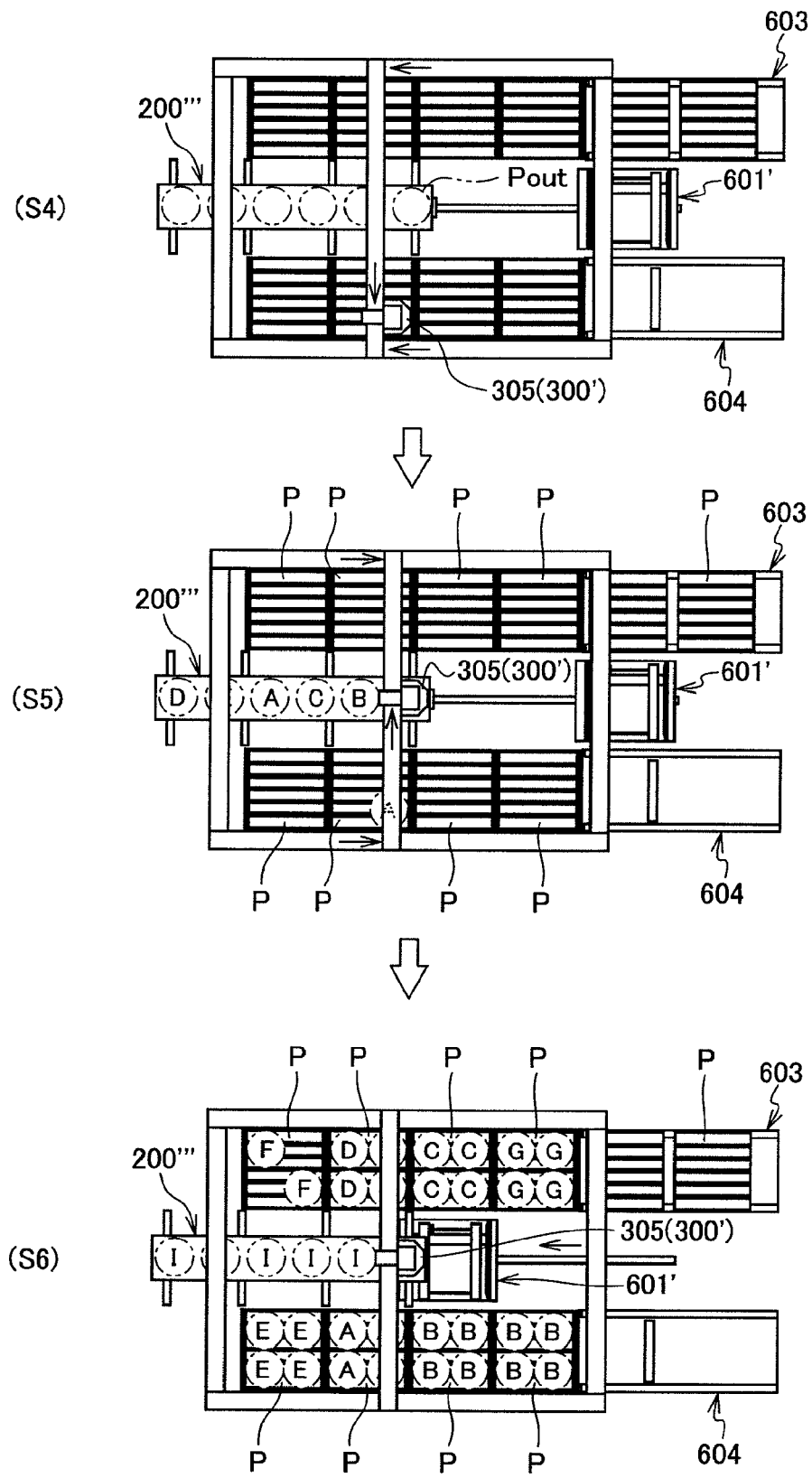
FIG. 32 is an operation diagram for explaining an operation of the storage system shown in FIGS. 27 to 29.

Here, as shown in (S5, S6) in FIG. 32, the type of the article W stored on the pallet P at the coordinate (X2, Y2) is type A, and the articles W of type A are loaded on the remaining three loading spaces on this pallet P.

That is, the address-space setting step for setting the address spaces corresponding to the eight pallets P on the basis of the type of the article W which was transferred first is performed here.

By setting (allocating) the address space on the basis of the type of the article W which was loaded first as above, the flexible storage processing corresponding to the time-dependent request or the like each time can be performed.

The transfer mechanism 300' (holding unit 305) is set, similarly in the following as shown in (S6) in FIG. 32, so that the article W of type A is transferred onto the pallet P at the coordinate (X2, Y2) and the articles W of types F, D, C, G, E, B, B are transferred onto each of the pallets P at the coordinates (X1, Y1), (X2, Y1), (X3, Y1), (X4, Y1), (X1, Y2), (X3, Y2), (X4, Y2). That is, on the basis of the information obtained by the reading step of an article and the address-space setting step, the carrying-in/transfer step for transferring the articles W onto the pallet P on the supporting table 100 by the transfer mechanism 300' is performed.

The two supporting tables 100 store 128 pieces (16×4×2) in total of the articles W on the eight pallets P in a state in which the articles W are stacked in 2×2 in plural stages (four stages), respectively.

With regard to the pallet P onto which the article W has been transferred by the carrying-in/transfer step, the information relating to the address space is updated in the address-space setting step. In the recording card attached to the pallet P, too, new information is written in and updated by the reading/writing unit 500.

According to the above, since the article W is transferred and the information relating to the address space is updated at the same time, the articles W can be surely transferred onto the pallet P with a limited capacity without overload, and the loading information of the article W in the pallet P can be managed with high accuracy.

Figure 33:
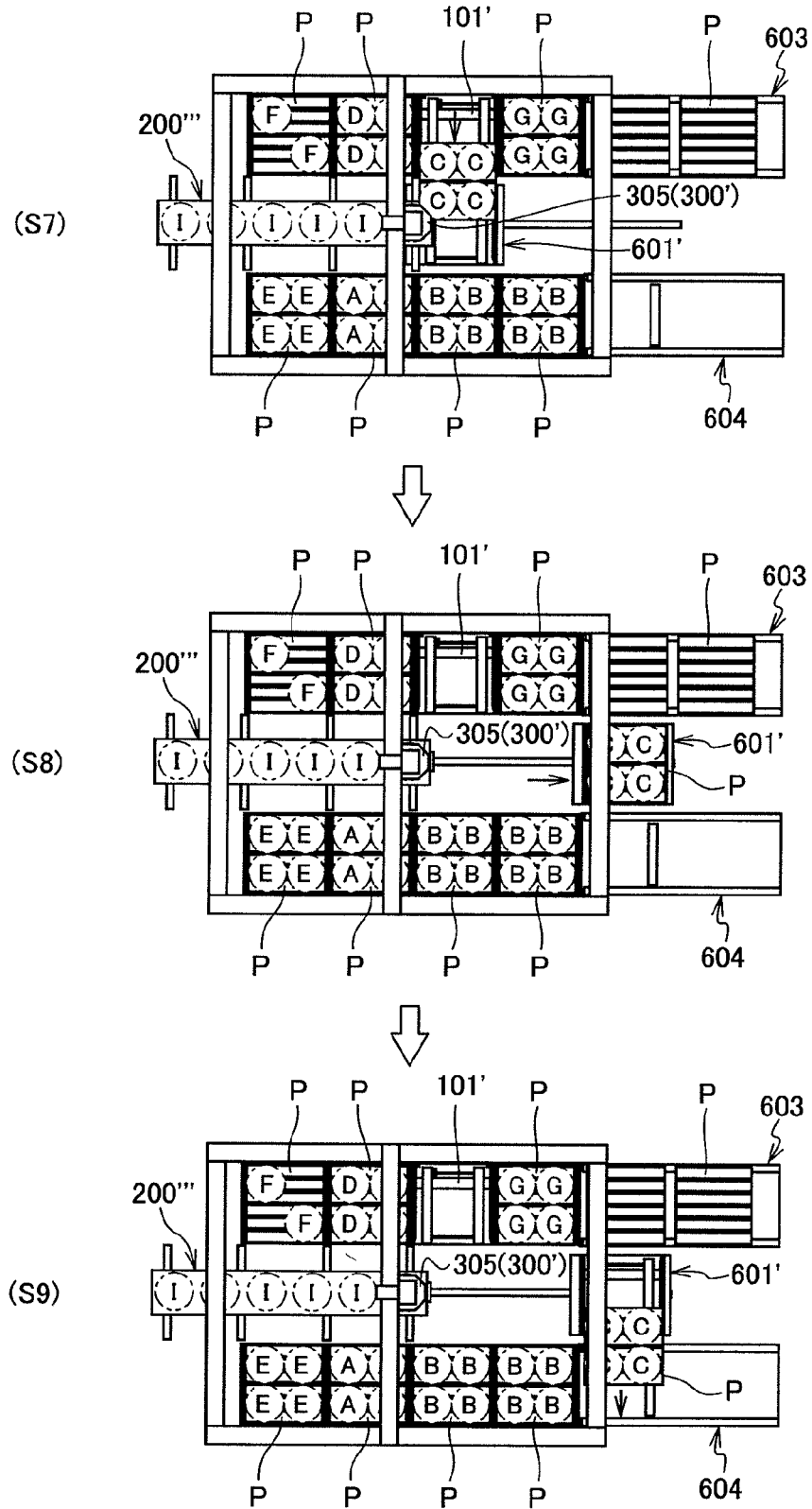
FIG. 33 is an operation diagram for explaining an operation of the storage system shown in FIGS. 27 to 29.

On the other hand, in the management processing, if there are both an urgent delivery request for the article W of type I having been not stored yet and a delivery request for the article W of type C, as shown in (S6) in FIG. 32, first, the movable unit 601' moves to a position corresponding to the pallet P filled with the articles W of type C, and the driving unit of the supporting portion 101' and the driving unit of the movable unit 601' give the driving forces, respectively, as shown in (S7) in FIG. 33 so that the movable unit 601' receives the pallet P on which the article W of type C is loaded.

Then, the movable unit 601' moves close to the outside of the storage area in the X direction as shown in (S8) in FIG. 33 and feeds out the supported pallet P onto the pallet carrying-out unit 604 as shown in (S9) in FIG. 33 similarly by the driving force of the driving unit. That is, the pallet carrying-out step for carrying out the article W for which carrying-out is requested among the articles w stored in the storage area by the pallet carrying-out unit 604 (carrying-out means) for each pallet P is performed.

As mentioned above, since the pallet P loaded with the article W corresponding to a request is carried out, the storage processing including the flow of carrying-in, transfer, storage, carrying-out and the like can be performed continuously without delay.

Figure 34:
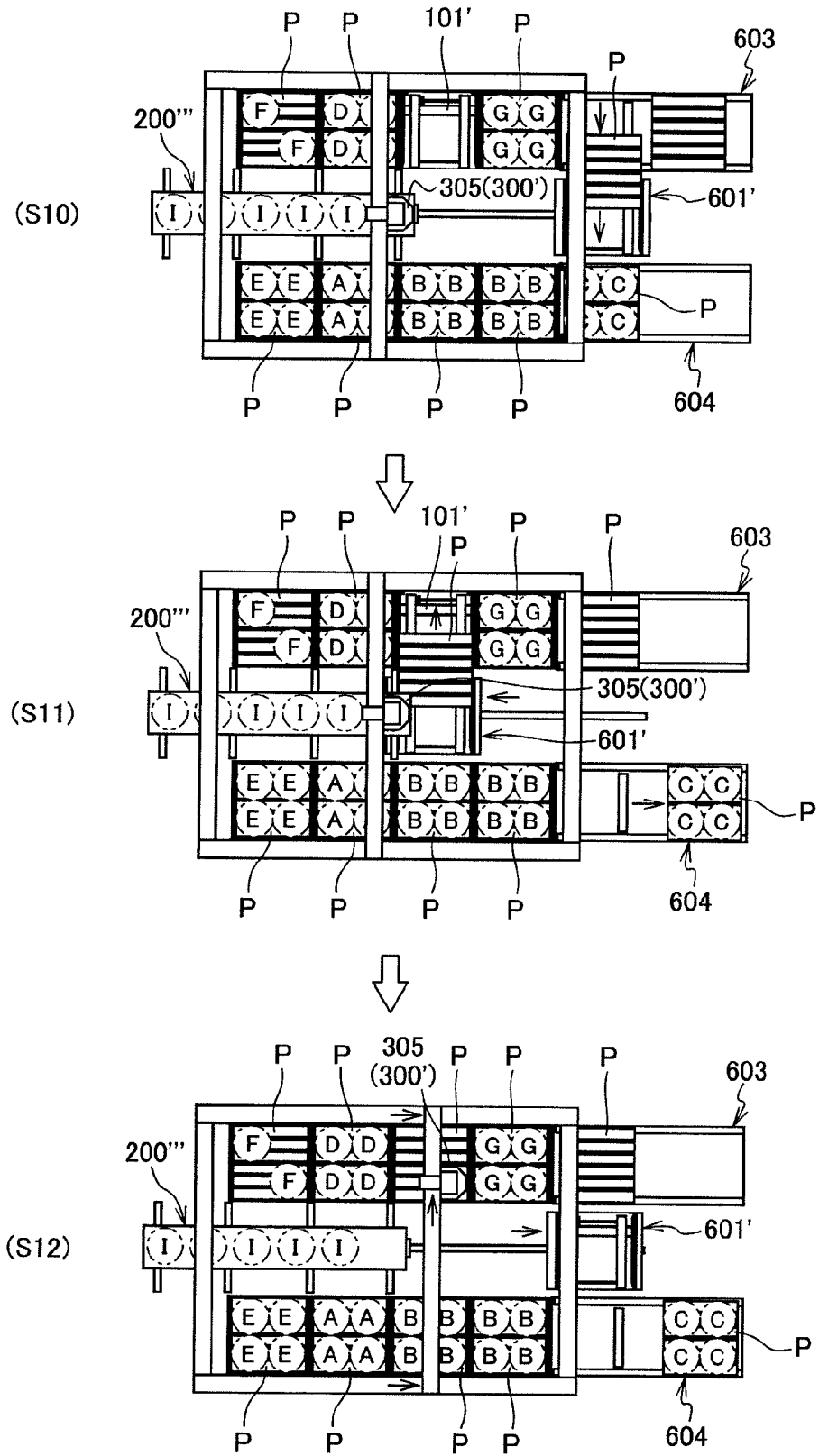
FIG. 34 is an operation diagram for explaining an operation of the storage system shown in FIGS. 27 to 29.

On the other hand, as shown in (S10) in FIG. 34, when the pallet carrying-in unit 603 carries in the empty pallets P to predetermined positions, the movable unit 601' receives the empty pallets P similarly by the driving force of the driving unit.

Then, the movable unit 601' moves, as shown in (S11) in FIG. 34, to the vicinity of the supporting portion 101' corresponding to the coordinate (X3, Y1), the driving unit of the supporting portion 101' and the driving unit of the movable unit 601' give the driving forces, respectively, so as to transfer the empty pallets P onto the supporting portions 101'.

Then, similarly to the above, the reading/writing unit 500 reads the recording cards provided on the empty pallets P newly supported by the supporting portions 101' (supporting positions) on the supporting table 100 (storage area), and on the basis of the read-out information, the address-space setting step for setting the address space corresponding to the pallets P is performed by the computer.

On the other hand, the movable unit 601' moves, as shown in (S12) in FIG. 34, to a standby position close to the pallet carrying-in unit 603 and the pallet carrying-out unit 604.

The pallet P loaded with the article W of type C carried out onto the pallet carrying-out unit 604 is fed out toward the subsequent process such as a manufacturing line.

Subsequently, in the articles W of type I having been carried in by the carrying-in line 200''', the read labels are read by the reading sensor 400, and the transfer mechanism 300' moves similarly to the above to transfer the articles W of type I onto the empty pallets P.

When the transfer of the articles W of type I to the pallet P, which is urgent, has been completed, by means of the movable unit 601' and the pallet carrying-out unit 604 through the operation similar to the above, the pallets P loaded with the articles W of type I are carried out toward the outside and transferred to the required location (the subsequent process in the manufacturing line, for example).

When this urgent carrying-out processing is finished, similarly to the above, the carrying-in of the empty pallets P, carrying-in and transfer of the articles W and the like, are performed.

According to the above storage system, similarly to the above, since the pair of supporting tables 100 arranging and supporting the plurality of pallets P on which the articles W can be loaded are employed as a storage area and the transfer mechanism 300' transfers the articles W to the pallets P supported on the pair of supporting tables 100 and the articles W are stored in the stacked state with respect to the pallet P, when the article W is to be taken out in response to the delivery request, by automatically taking out each pallet P by the pallet conveying line 600', the operation to transfer the articles directly stored on the floor face as before to the pallet is not needed any more, by which the carrying-out processing is simplified, and the efficiency of the storage processing of the articles W as a whole (carrying-in from the outside, transfer to the storage area, carrying-out to the outside) is improved.

If the storage (allocation) location of the article W is to be changed on the basis of the management plan of the articles W, the storage (allocation) location can be easily changed by taking in/out each pallet P on which the article W is loaded with respect to the supporting positions on the pair of supporting tables 100.

Moreover, since the two supporting tables 100 arranged and provided on both sides in the horizontal direction putting the carrying-in line 200''' between them are employed, and the carrying-in line 200''' defines the taking-out position Pout where the transfer mechanism 300' takes out the article W at the substantially center position in the storage area, the articles W which have been carried in by the carrying-in line 200''' can be sorted to the both sides for storage, and since the transfer mechanism 300' takes out the articles W at the substantially center position in the storage area (taking-out position Pout) and transfers them to the respective storage location (pallet P), the transfer operation can be performed in a short moving distance toward the both sides symmetrically with respect to the substantially center position as the center, by which the transfer time can be shortened and the transfer efficiency can be further improved.

Also, the pallet conveying line 600' may perform either one of the carrying-in operation of the pallet P or the carrying-out operation of the pallet P in a collaborated work with the forklift FL. In this case, the forklift FL performs an operation assisting the operation of the pallet conveying line 600'. For example, if the pallet conveying line 600' performs the carrying-in operation of the pallet P, the forklift FL performs the carrying-out operation of the pallet P. As a result, the efficiency of the storage processing can be further improved.

Figure 35:
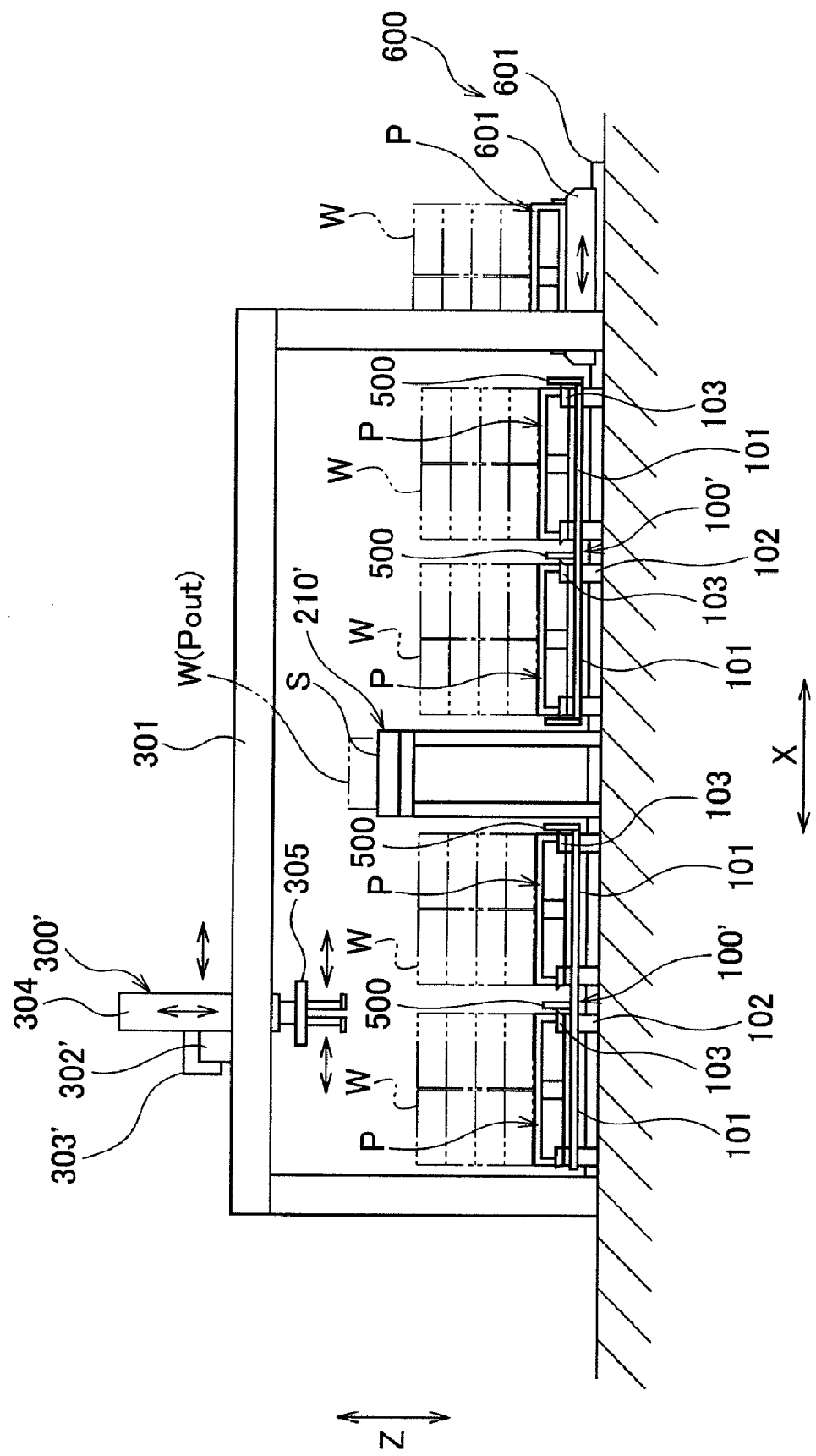
FIG. 35 is a front view illustrating still another embodiment of the storage system according to the present invention.
Figure 36:
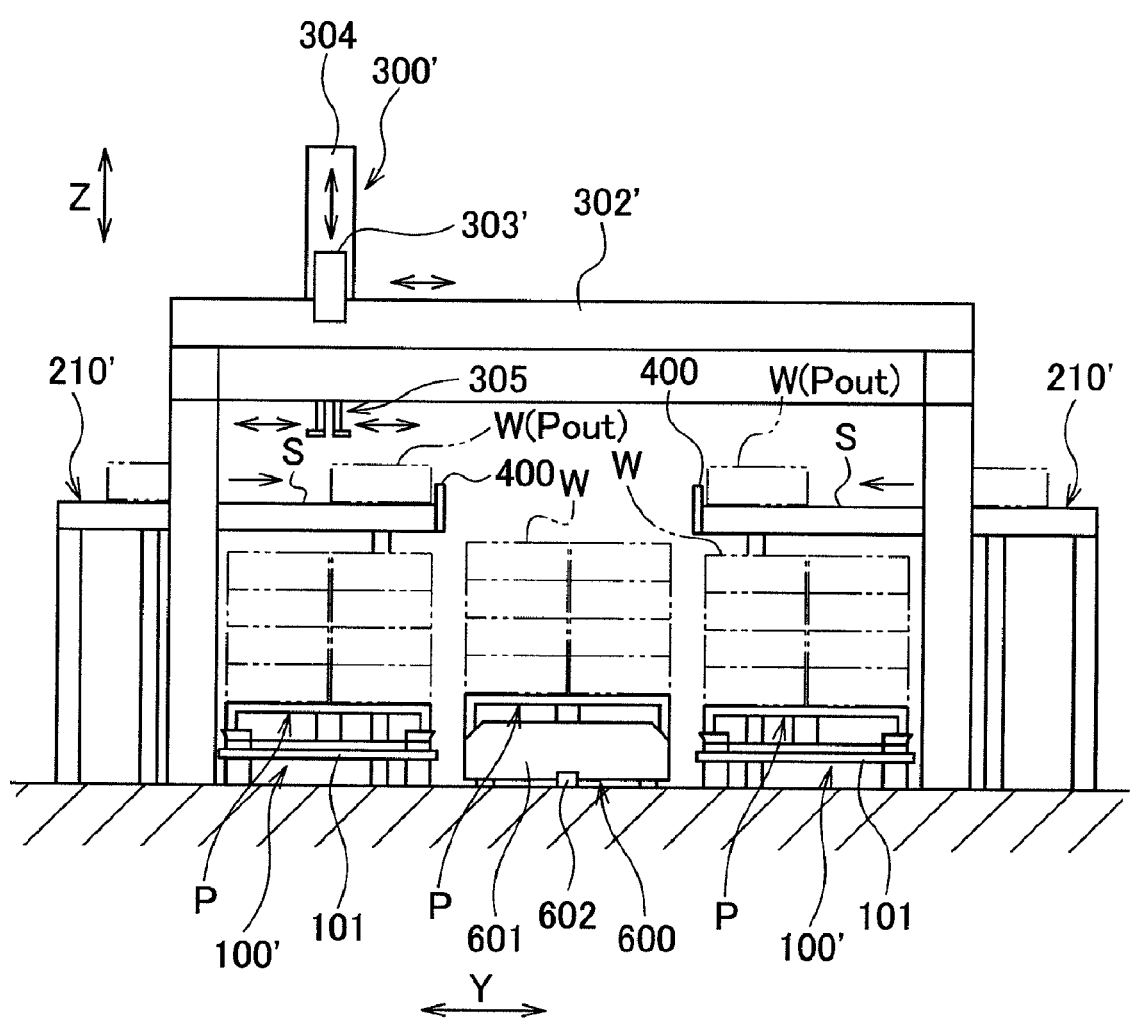
FIG. 36 is a side view of the storage system shown in FIG. 35.
Figure 37:
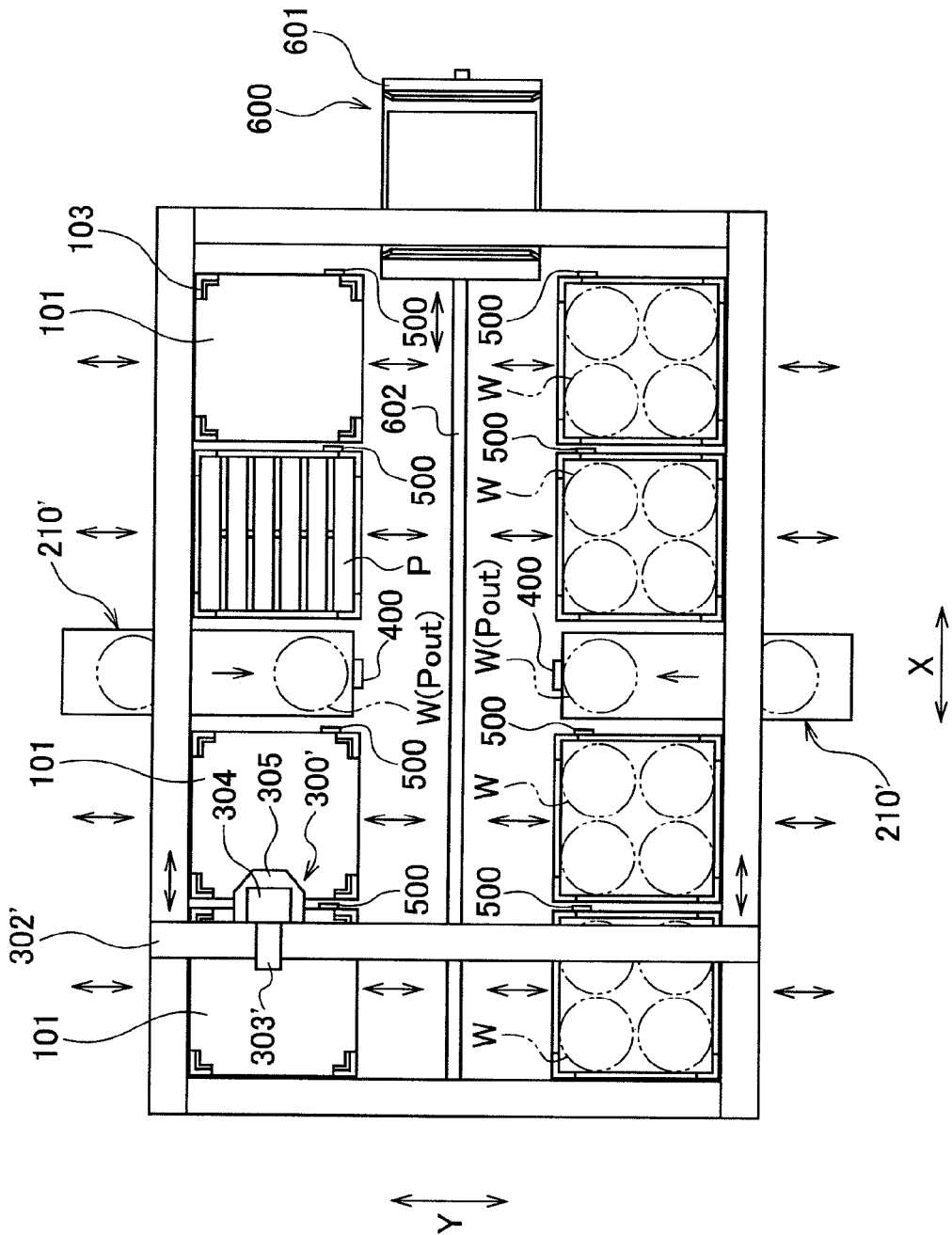
FIG. 37 is a plan view of the storage system shown in FIG. 35.

FIGS. 35 to 37 show still another embodiment of the storage system according to the present invention and the same configurations as those in the above embodiment are given the same reference numerals and the description will be omitted.

That is, this storage system is, as shown in FIGS. 35 to 37, provided with two pairs of supporting tables 100' as a storage area separated in the X direction and making pairs, respectively, a carrying-in line 210' arranged so as to be put between one pair of supporting tables 100, another carrying-in line 210' arranged between another pair of supporting tables 100', the transfer mechanisms 300' arranged on the upper region (ceiling region) of the two pairs of supporting tables 100' (storage area), the pallet conveying line 600 movably arranged in the X direction between one pair of supporting tables 100' and another pair of supporting tables 100', and the like.

That is, this storage system is so configured, in the embodiment shown in FIG. 24, that the two supporting tables 100 extending in the X direction are divided in the middle in the X direction into two parts so as to have two pairs of supporting tables 100', and the carrying-in lines 210' are arranged between the supporting tables 100' divided into two parts, respectively.

The carrying-in line 210' changes a height of the feeding face S to a position higher than the maximum height of the articles W stacked on the pallet P supported by the supporting table 100', with respect to the carrying-in line 200' of the embodiment shown in FIGS. 8 to 10.

Also, the carrying-in line 210' is arranged so that its deepest end is not overlapped with a moving region of the pallet conveying line 600.

Since the operation in this storage system is substantially the same as that in the above-mentioned embodiment, the description here is omitted.

According to this storage system, since the two pairs of supporting tables 100' arranging and supporting the plurality of pallets P on which the articles W can be loaded are employed as a storage area, the transfer mechanism 300' transfers the articles W to the pallets P supported on the two pairs of supporting tables 100', and the articles W are stored on the pallets P in the stacked state, when the article W is to be taken out in response to the delivery request, by automatically taking out each pallet P by the pallet conveying line 600, the operation to transfer the articles directly stored on the floor face as before to the pallet is not needed any more, by which the carrying-out processing is simplified, and the efficiency of the storage processing of the articles W as a whole (carrying-in from the outside, transfer to the storage area, carrying-out to the outside) is improved.

Particularly, since the movable unit 601 can reciprocally move in the X direction between the supporting tables 100' arranged on the both sides in the Y direction so as to deliver the pallet P with the pair of supporting tables 100' on one side or the pair of supporting tables 100' on the other side, the taking in/out operation and the carrying-out operation of the pallet P which is empty or on which the articles W are loaded can be performed efficiently.

Since the two carrying-in lines 210' are provided, the carrying-in efficiency of the articles W can be further improved, and since the feeding face S of the carrying-in line 210' is arranged at a position higher than the maximum height of the articles W stacked on the pallet P supported by the supporting table 100', only by slightly lifting up the article W from the feeding face S and holding it and then, moving horizontally or downward to transfer it to the pallet P, there is no need for the transfer mechanism 300' to lift up the article W high, and the transfer operation can be simplified or the work amount (load) can be reduced for that amount, and the efficiency of the storage processing can be improved as a whole.

Also, if the storage (allocation) location of the article W is to be changed on the basis of the management plan of the articles W, the storage (allocation) location can be easily changed by taking in/out each pallet P on which the article W is loaded with respect to the supporting positions on the two pairs of supporting tables 100'.

Also, since the supporting tables 100' are arranged on both sides in the horizontal direction (X direction) putting the carrying-in line 210' between them, and the carrying-in line 210' defines the taking-out position Pout where the transfer mechanism 300' takes out the article W at the substantially center position in the storage area, the article W having been carried in by the carrying-in line 210' can be sorted to the both sides for storage, and the transfer mechanism 300' takes out the articles W at the substantially center position (taking-out position Pout) of the storage area and transfers them to the respective storage locations (pallets P), the transfer operation can be performed in a short moving distance toward the both sides symmetrically with respect to the substantially center position as the center and thus, the transfer time can be shortened and the transfer efficiency can be further improved.

Moreover, the pallet conveying line 600 may perform either one of the carrying-in operation of the pallet P or the carrying-out operation of the pallet P in a collaborated work with the forklift FL. In this case, the forklift FL performs an operation assisting the operation of the pallet conveying line 600. For example, if the pallet conveying line 600 performs the carrying-in operation of the pallet P, the forklift FL performs the carrying-out operation of the pallet P. As a result, the efficiency of the storage processing can be further improved.

In this embodiment, the case of employing two carrying-in lines 210' is shown, but only one carrying-in line 210' may be employed.

On the other hand, similarly to this embodiment, in the embodiments shown in FIGS. 13, 20, 23, 24, 26, and 29, too, two carrying-in lines may be employed in order to improve the storage (carrying-in, transfer) efficiency.

In the above embodiment, in the address-space setting step, the case in which the address spaces corresponding to the plurality of pallets P are set on the basis of the type of the article W which was transferred first is shown, but not limited to that, such a method of setting the address spaces corresponding to the plurality of pallets P in accordance with the assumed type of the article W in advance may be employed.

According to this method, by setting (allocating) the address spaces according to the assumed type of the articles W in advance, well-planned and efficient storage processing can be performed.

Also, in the above embodiment, as the article W which is stored in this storage system, a tire applied to a vehicle is shown, but not limited to that, other products (electric products, mechanical products and the like) may be applied, and though as the method of loading the articles W on the pallet P, the case in which they are stacked in 2 rows by 2 columns in four stages is shown, but not limited to that, other loading methods or a method of loading only a single large article may be applied.

INDUSTRIAL APPLICABILITY

As mentioned above, with the storage system and the storage method of the present invention, since the processing of carrying-in and storing an article (a product such as a tire, for example) or carrying-out the stored article according to a request can be efficiently performed while space saving and size reduction of the installation area, simplification of the structure and the like are achieved, and the various diversified articles can be surely stored after being sorted by the type, it is needless to say that the present invention can be applied to a manufacturing line of storing the products such as tires in a stacked manner and carrying them out according to a request but not limited to the manufacturing lines, the invention can be used merely as a storage for products.

The invention claimed is:

1. A storage system comprising:
   a storage area for arranging and storing an article;
   a carrying-in line for carrying in the article toward the storage area; and
   a transfer mechanism arranged in an upper region of the storage area, for transferring the article which was carried in by the carrying-in line to the storage area, wherein
      the storage area includes a supporting table for supporting a plurality of pallets on which the article can be loaded in an arranged state;
      the transfer mechanism includes a fixed frame extending in a X direction and a Y direction so as to surround an upper region of the storage area, a movable frame movably supported in the Y direction with respect to the fixed frame, a slider movably supported in the X direction with respect to the movable frame, an elevating arm supported capable of elevation in a vertical direction with respect to the slider, and a holding unit provided at a lower end of the elevating arm and capable of holding the article, further comprising:
      a pallet conveying line arranged along the supporting table in order to carry in the pallet toward the supporting table and/or for carrying out the pallet from the supporting table; and
      a reading means provided at the carrying-in line in order to read information of an information medium attached to the article, wherein
      the transfer mechanism transfers the article to a predetermined position on a predetermined pallet supported on the supporting table on a basis of the information read by the reading means.

2. The storage system according to claim 1, wherein
   the pallet conveying line includes a guide rail extending along the supporting table, and a movable unit movably supported by the guide rail and on which a pallet can be loaded; and
   the movable unit includes a driving unit for feeding out or taking in of the pallet with the supporting table.

3. The storage system according to claim 2, wherein
   the pallet conveying line includes a pallet carrying-in unit arranged adjacent to one side of the guide rail, for carrying in a pallet into the movable unit; and a pallet carrying-out unit arranged adjacent to the other side of the guide rail, for carrying out the pallet from the movable unit.

4. The storage system according to claim 2, wherein
   the driving unit includes a belt conveyer on which a pallet can be loaded, and a driving motor for driving the belt conveyer.

5. The storage system according to claim 1, wherein
   the carrying-in line includes a feeding portion for feeding articles, and a gate-like leg portion for supporting the feeding portion above the pallet conveying line at a height position enabling feeding by the pallet conveying line in a state where the articles are stacked on the pallet.

6. The storage system according to claim 5, wherein
   the carrying-in line is arranged in parallel with a longitudinal direction of the supporting table.

7. The storage system according to claim 1, wherein
   the carrying-in line is arranged so as to orthogonally cross the longitudinal direction at an intermediate position equally dividing the supporting table into two parts in the longitudinal direction.

8. The storage system according to claim 6, wherein
   the storage area includes a plurality of the supporting tables arranged in parallel so as to form plural rows; and
   the carrying-in line and the pallet conveying line are arranged between the supporting tables forming the plural rows.

9. The storage system according to claim 7, wherein
   the carrying-in lines are arranged in opposing two in a direction orthogonally crossing the longitudinal direction at an intermediate position equally dividing the supporting table into two parts in the longitudinal direction; and
   the pallet conveying line is arranged along the longitudinal direction of the supporting table between the two carrying-in lines.

10. The storage system according to claim 1, wherein
   the supporting table includes a reading/writing means for reading information of an information medium attached to a pallet being to be supported thereby or writing the information in the information medium; and
   the reading/writing means updates the information of the information medium when loading information of the article which is loaded on the pallet supported by the supporting table is changed.

11. A storage method for carrying in an article by a carrying-in line and transferring the article by a transfer mechanism to a storage area for storage or for carrying out the article in response to a request, comprising:
   a pallet carrying-in step for carrying in a plurality of pallets supported by a supporting table arranged in the storage area defined by a transfer range of the transfer mechanism by means of a pallet conveying line;
   an address-space setting step for reading information of an information medium relating to the plurality of pallets supported by the supporting table and for setting a address space corresponding to each of the pallets;

a reading step of an article for reading the information of the information medium relating to the article which has been carried in by the carrying-in line;

a carrying-in/transfer step for transferring the article to a predetermined pallet on the supporting table by the transfer mechanism on a basis of the information obtained by the reading step of an article and address-space setting step; and an address-space updating step for updating the information relating to the address space for the pallet to which the article was transferred by the carrying-in/transfer step.

12. The storage method according to claim 11, further comprising:

a pallet carrying-out step, when a carrying-out request for an article which is stored on a predetermined pallet of the storage area is made, for carrying out the article for which the carrying-out is requested by a carrying-out means or the pallet conveying line for each pallet; and a pallet carrying-in step for carrying in different pallets at positions of the pallets carried out by the pallet carrying-out step.

13. The storage method according to claim 11, wherein
the address-space setting step sets address spaces corresponding to a plurality of pallets on a basis of a size of the article for each pallet.

14. The storage method according to claim 11, wherein
the address-space setting step sets address spaces corresponding to a plurality of pallets in advance in accordance with assumed types of the articles.

15. The storage method according to claim 11, wherein
the address-space setting step sets an address space corresponding to each of a plurality of pallets on a basis of a type of the article which was transferred first.

16. The storage method according to claim 11, wherein
the reading step of an article is performed at a taking-out position on the carrying-in line for taking out an article by the transfer mechanism.

17. The storage system according to claim 5, wherein
the supporting table includes a reading/writing means for reading information of an information medium attached to a pallet being to be supported thereby or writing the information in the information medium; and the reading/writing means updates the information of the information medium when loading information of the article which is loaded on the pallet supported by the supporting table is changed.

* * * * *